(12) United States Patent
Nguyen et al.

(10) Patent No.: US 7,099,786 B2
(45) Date of Patent: Aug. 29, 2006

(54) SIGNALING ACCOMMODATION

(75) Inventors: Huy M. Nguyen, San Jose, CA (US); Benedict C. Lau, San Jose, CA (US)

(73) Assignee: Rambus Inc., Los Altos, CA (US)

( * ) Notice: Subject to any disclaimer, the term of this patent is extended or adjusted under 35 U.S.C. 154(b) by 0 days.

(21) Appl. No.: 11/064,925

(22) Filed: Feb. 24, 2005

(65) Prior Publication Data

US 2005/0154547 A1 Jul. 14, 2005

Related U.S. Application Data

(60) Division of application No. 10/157,593, filed on May 28, 2002, now Pat. No. 6,876,248, which is a continuation-in-part of application No. 10/076,666, filed on Feb. 14, 2002, now Pat. No. 6,897,713.

(51) Int. Cl.
*G01R 21/06* (2006.01)

(52) U.S. Cl. .......................... 702/62; 326/21; 327/541

(58) Field of Classification Search .................. 702/46, 702/57, 58, 62, 64, 65, 69, 71, 79, 80, 90, 702/106, 111, 117, 118, 120, 122, 188, 191, 702/193; 327/108, 541; 326/21, 66
See application file for complete search history.

(56) References Cited

U.S. PATENT DOCUMENTS

| | | | |
|---|---|---|---|
| 4,604,732 A | | 8/1986 | van Tran |
| 5,170,136 A | * | 12/1992 | Yamakawa et al. .......... 331/176 |
| 5,296,756 A | * | 3/1994 | Patel et al. ..................... 326/21 |
| 5,329,184 A | * | 7/1994 | Redfern ........................ 326/66 |
| 5,426,616 A | | 6/1995 | Kajigaya et al. |
| 5,449,897 A | * | 9/1995 | Bertelsen et al. ........... 250/207 |
| 5,734,373 A | | 3/1998 | Rosenberg et al. |
| 5,764,541 A | * | 6/1998 | Hermann et al. ............. 702/98 |
| 5,841,486 A | * | 11/1998 | Ando et al. .................. 348/673 |
| 5,999,021 A | | 12/1999 | Jang |
| 6,028,438 A | | 2/2000 | Gillette |
| 6,118,265 A | * | 9/2000 | Larsen et al. ................ 323/316 |
| 6,154,065 A | | 11/2000 | Komatsu |
| 6,229,383 B1 | | 5/2001 | Ooishi |
| 6,239,652 B1 | * | 5/2001 | Oh et al. ..................... 327/541 |
| 6,288,954 B1 | | 9/2001 | Manning |

(Continued)

FOREIGN PATENT DOCUMENTS

JP 60163528 8/1985

*Primary Examiner*—Marc S. Hoff
*Assistant Examiner*—Mohamed Charioui
(74) *Attorney, Agent, or Firm*—Silicon Edge Law Group; Arthur J. Behiel

(57) ABSTRACT

A receiving unit may implement voltage compensation using a parameters table, an analog calibration component, and/or a digital calibration component. In certain implementation(s), an integrated circuit may include a voltage driver that modifies a supplied compensated voltage based on a feedback signal. The feedback signal may be produced responsive to a distributed voltage version of the compensated voltage, to a received data signal, and to a comparison involving an expected data value. In other implementation(s), a parameters table may be initialized by storing calibration values in entries in association with respective multiple identifications of multiple external points. In still other implementation(s), a particular calibration value of multiple calibration values may be ascertained, with the particular calibration value associated with a particular external point; the particular calibration value may be activated; and data from the particular external point may be received using the particular calibration value. Other implementations are also described.

24 Claims, 16 Drawing Sheets

U.S. PATENT DOCUMENTS 6,459,398 B1    10/2002   Gureshnik et al.
6,556,052 B1 *  4/2003    Garrett et al. .............. 327/108
6,559,731 B1 *  5/2003    Jakobsson .................. 331/176

* cited by examiner

PARAMETER(S) TABLE 320

| ID # | ---- | $V_{COMP}$ REGISTER VALUE | ---- | ATTRIBUTES TYPE |
|---|---|---|---|---|
| ID #1 | ---- | $V_{COMP}$ REGISTER VALUE #1 | ---- | TYPE A ATTRIBUTES |
| ID #2 | ---- | $V_{COMP}$ REGISTER VALUE #2 | ---- | TYPE K ATTRIBUTES |
| ID #3 | ---- | $V_{COMP}$ REGISTER VALUE #3 | ---- | TYPE C ATTRIBUTES |
| ID #4 | ---- | $V_{COMP}$ REGISTER VALUE #4 | ---- | TYPE M ATTRIBUTES |
| ID #5 | ---- | $V_{COMP}$ REGISTER VALUE #5 | ---- | TYPE K ATTRIBUTES |
| ... | | ... | | ... |
| ID #n | ---- | $V_{COMP}$ REGISTER VALUE #n | ---- | TYPE x ATTRIBUTES |

FIG. 11B

SIGNALING ACCOMMODATION

CROSS-REFERENCE(S) TO RELATED APPLICATION(S)

This U.S. Patent Application is a divisional patent application of prior application Ser. No. 10/157,593, filed on 28 May 2002, which is a continuation-in-part of prior application Ser. No. 10/076,666, filed on 14 Feb. 2002. U.S. application Ser. Nos. 10/076,666 and 10/157,593 have issued as U.S. Pat. Nos. 6,897,713 and 6,876,248, respectively, and are hereby incorporated by reference in their entirety herein.

TECHNICAL FIELD

This disclosure relates in general to the field of signaling accommodation, and in particular, by way of example but not limitation, to making accommodations for different types of signals being received under various conditions.

BACKGROUND

As complementary metal oxide semiconductor (CMOS) and other semiconductor technologies shrink in size, there are corresponding improvements in device capacity, bandwidth, and cost. Furthermore, as frequencies of devices and buses increase, the performance of electronics may also increase proportionally. However, shrinking process technologies and increasing frequencies also present challenges, often requiring designers to compensate for various undesirable side-effects.

As an example, as semiconductor processing technologies have improved, the interconnect traces that semiconductor device manufacturers use to interconnect components on integrated circuits have become much smaller in both width and depth. Because of this, such traces are often more resistive than in the past. Furthermore, smaller sizes and thinner oxide layers often increase the current leakage of transistor gates. These two factors combine to produce higher voltage drops along device interconnect traces. Such voltage drops can pose problems in many situations, including for example, reduced voltage margins and decreased signal integrity.

The increased density and higher operational frequencies of semiconductor devices also increase the coupling of noise from adjacent traces and device elements. Compounding these problems is the tendency of many newer devices to utilize lower signal voltages. Voltage drop and noise coupling become even more problematic in the face of such lower absolute and relative voltages. Furthermore, real-world devices in general suffer from manufacturing process imperfections and experience nominal voltage and temperature variations during operation.

Various forms of differential signaling are often used to address the problems mentioned above. In one form of differential signaling, often referred to as "pseudo-differential" signaling, a common reference voltage is distributed to multiple signal receivers. Signal voltages are then specified relative to the common reference voltage. Such signal voltages may be digital or analog in nature. Regardless, the multiple signal receivers interpret respective data signal voltages by comparing each of them to the common reference voltage to produce output signal voltages.

To reduce the effects of voltage drops and noise coupling, both a signal (such as a data signal) and its associated reference voltage may be given similar physical routings. Because of their similar routings, both the signal voltage and the reference voltage are subject to similar degrading influences (such as voltage drop and noise coupling), and the signal voltage therefore maintains a generally fixed—or at least proportional—relationship with the reference voltage.

Within a given integrated circuit, using similar physical routings for a signal and its associated reference voltage is effective to some degree, but it can be inadequate in devices where interconnect resistances are high and/or where there are large leakage currents. A typical individual physical routing has a resistance that increases as its length increases. A voltage drop over such a physical routing may be calculated as the product of the resistance and any leakage current produced by devices connected by way of the routing. As an example, the traces of a modern CMOS process might exhibit a resistance of 100 milli Ohms per micron of trace length. Leakage currents might be on the order of 200 nano Amps per square micron. Assuming a trace length of 1000 microns and a trace width of 0.33 microns, a typical interconnection scheme might produce a voltage drop of approximately 192 milli Volts between a nominal reference voltage and the "actual" reference voltage as it is received by various components, including "pseudo-differential" signal receivers.

Such a drop in actual reference voltage can result in significantly decreased margin or "headroom" between the actual reference voltage and ground. Also, as the reference voltage approaches ground, there is a concomitant reduction in the range of voltages that qualify as "low" in comparison to the reference voltage. Consequently, the circuitry exhibits increased sensitivity to noise. The problem is particularly acute in high-speed devices where even the nominal or ideal reference voltage value is relatively low. In devices such as these, any further lowering of the nominal reference voltage threatens to significantly impair device operation. Furthermore, as semiconductor process technologies continue to shrink and to operate at ever higher frequencies, and as operating voltages continue to decrease, these types of interconnect-related voltage drops will become even more significant.

When two integrated circuit (IC) chips are engaged in a communication, a signal may be transmitted from one chip and received at another chip. The signal may be a signal voltage that is transmitted over a channel between a transmitting chip and a receiving chip. In addition to voltage changes (such as voltage drops) that result from interconnect traces that are internal to a given IC chip that is receiving a data signal (i.e., those voltage changes within a receiving chip), voltage changes can result from effects internal to a transmitting chip and from effects of a channel that interconnect the transmitting and receiving chips. For example, channel DC resistance induces voltage errors in many current signaling systems. Because of channel DC resistance, a data signal can shift in voltage as it traverses a signaling channel. Consequently, the farther apart two chips are located on a given signaling channel, the greater the voltage swing reduction that is likely to occur because of increasing channel DC resistance that forms a voltage divider with termination resistance.

In short, data signaling voltages can be adversely affected by increasing and/or differing resistances and currents, by increasing frequencies, by noise corruption, etc. due to effects both internal to one or more chips and the data signaling channel therebetween. Taken individually, any one of these factors can result in data signaling errors. Collectively, these factors can severely impact the ability to properly detect received data signaling—especially if data signaling voltage changes and "actual" reference voltage changes occur in converging directions.

BRIEF DESCRIPTION OF THE DRAWINGS

In the Drawings, like numerals are used for like and/or corresponding features, aspects, and components of the various FIGS. 1–11C.

FIG. 11B illustrates an exemplary parameters table.

DETAILED DESCRIPTION

Figure 1:
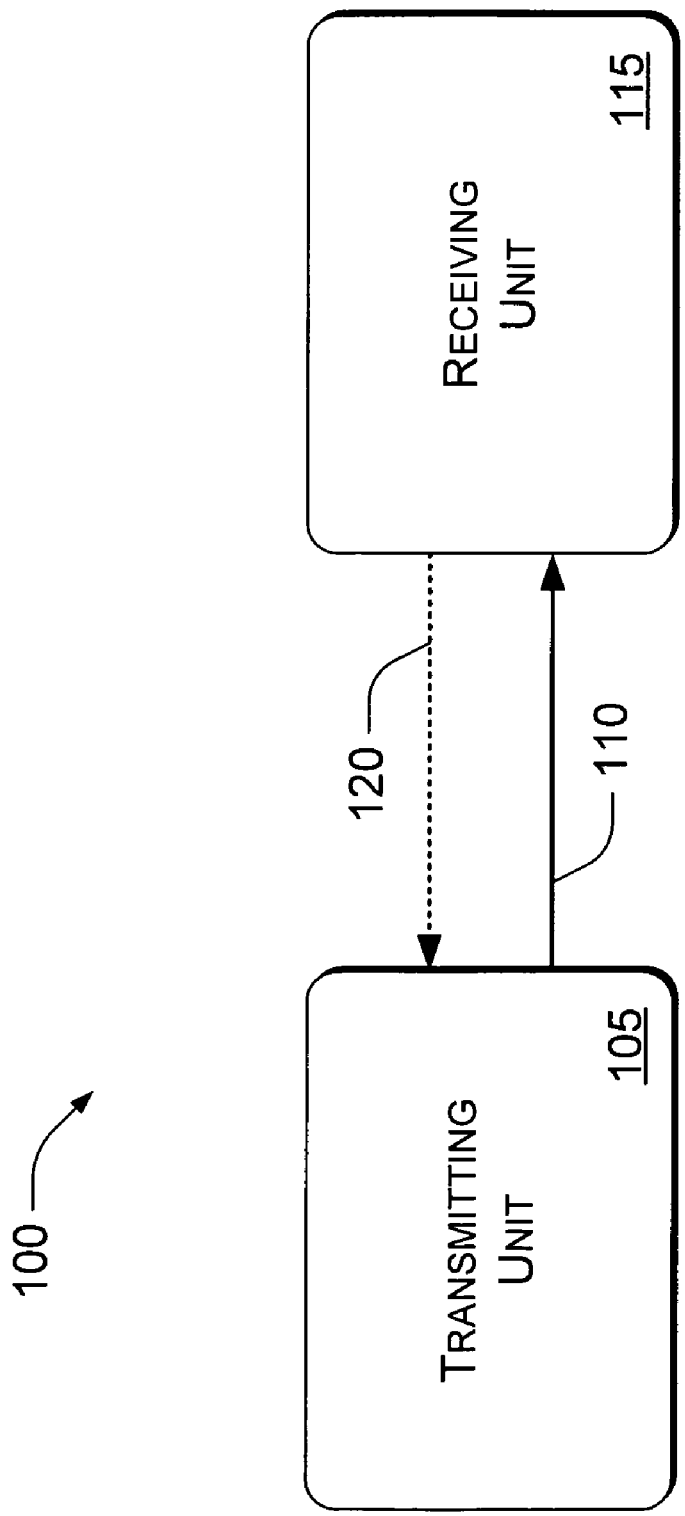
FIG. 1 illustrates signaling between exemplary electronic units.

FIG. 1 shows a system 100 that employs signaling between exemplary electronic units. A transmitting unit 105 sends a signal 110 to a receiving unit 115. The receiving unit 115 receives the signal 110 from the transmitting unit 105. The units 105 and 115 include components for transmitting and/or receiving the signal 110, and each may additionally include other components related to other functions. Although only a single signal 110 is shown being transmitted from the transmitting unit 105 to the receiving unit 115, in many cases there may be multiple signals transmitted from the transmitting unit 105 to the receiving unit 115, and the units shown may have multiple transmitters and receivers for handling such multiple signals. Additionally, one or more signals may be transmitted from the receiving unit 115 to the transmitting unit 105, as indicated by the dashed arrow representing optional signal(s) 120.

The transmitting unit 105 and the receiving unit 115 may be on the same integrated circuit, may be on different integrated circuits (e.g., on a single printed circuit board (PCB) or different PCBs), may be on separate components (e.g., separate cards, modules, etc. connected by one or more buses, etc.), and so forth.

Although the signal(s) can be any general signal capable of communicating information, the signals may be digital or analog signals in the described implementation(s). If the signals are digital, for example, they may relate to memory read/write data, control data, address data, and so forth. However, such digital signals may more generally represent binary data in any computing system.

The signal 110 is subject to signal degradations—such as voltage changes—as it propagates between the transmitting unit 105 and the receiving unit 115. In order to mitigate the effects of such signal degradations, voltage compensation schemes and techniques (details of which are described below) may be implemented. Implementation of part or all of the described voltage compensation schemes and techniques facilitate a more accurate reception of the signal 110 at the receiving unit 115. Such voltage compensation schemes and techniques may be at least partially effective even when nominal or intended voltages have changed due to factors that are internal to the receiving unit 115, internal to the transmitting unit 105, external to the two units 105 and 115 (e.g., related to a channel therebetween), some combination thereof, and so forth.

Figure 2:
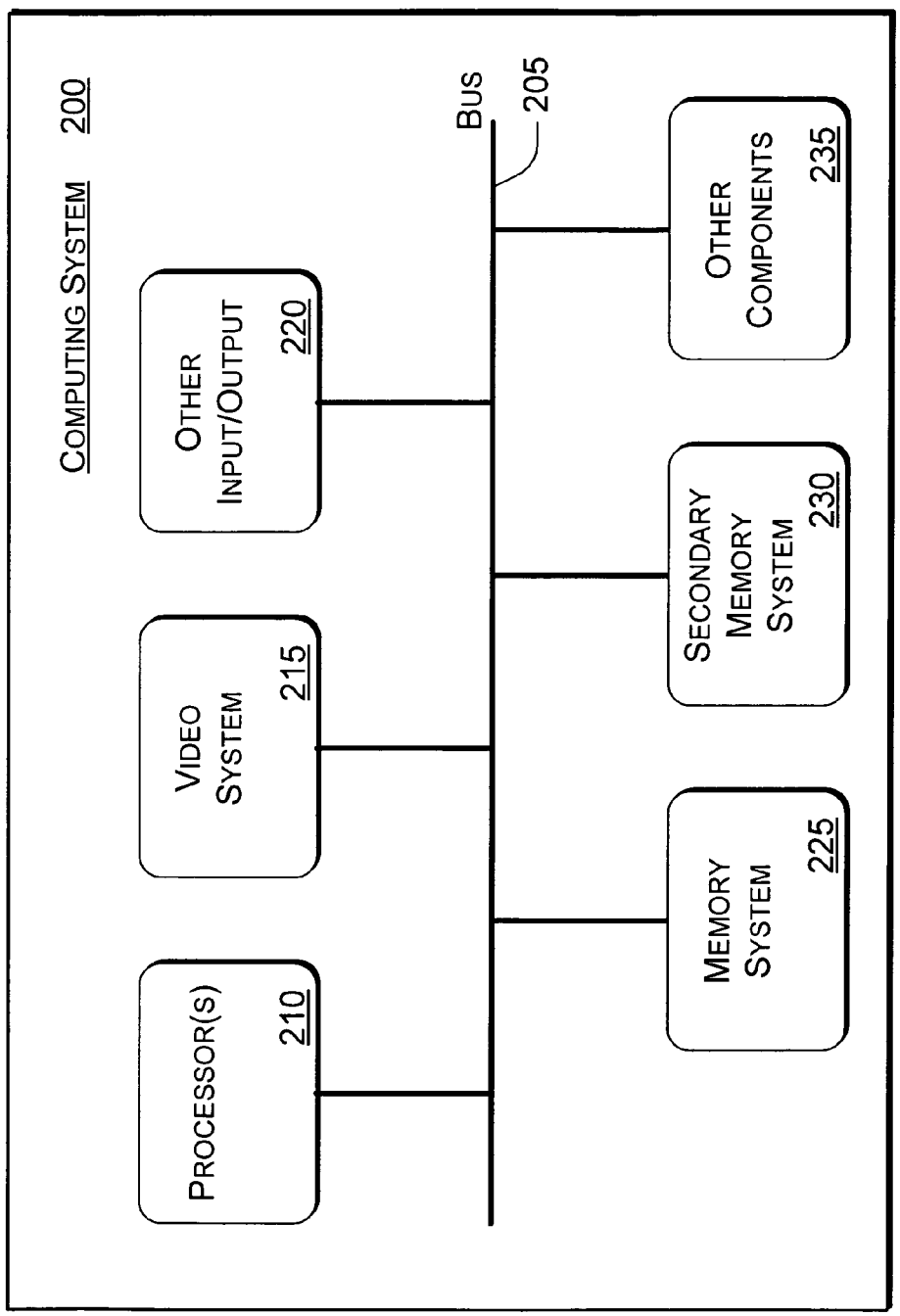
FIG. 2 illustrates an exemplary computing system having components that are capable of signaling.

FIG. 2 illustrates an exemplary computing system 200 having signaling components. Both the computing system 200 as a whole and the individual components thereof may act as a receiving unit 115 (of FIG. 1). For example, the components of the computing system 200 may receive signals over the bus 205, and they may therefore constitute receiving units 115. When a given component is also capable of sending signals, it may constitute a sending unit 105 in a particular signal exchange between two units. The bus 205 may be wires, interconnects across a PCB, and so forth.

The exemplary computing system 200 includes one or more processors 210, a video system 215 (e.g., a graphics card or similar), and other input/output 220 hardware. The exemplary components may additionally include a memory system 225 (e.g., a so-called primary memory system), a secondary memory system 230, and other components 235. Each of these components potentially acts as a transmitting unit and/or a receiving unit with respect to one or more signals. Each illustrated component might be implemented as a single device or as a combination of discrete devices.

Figure 3A:
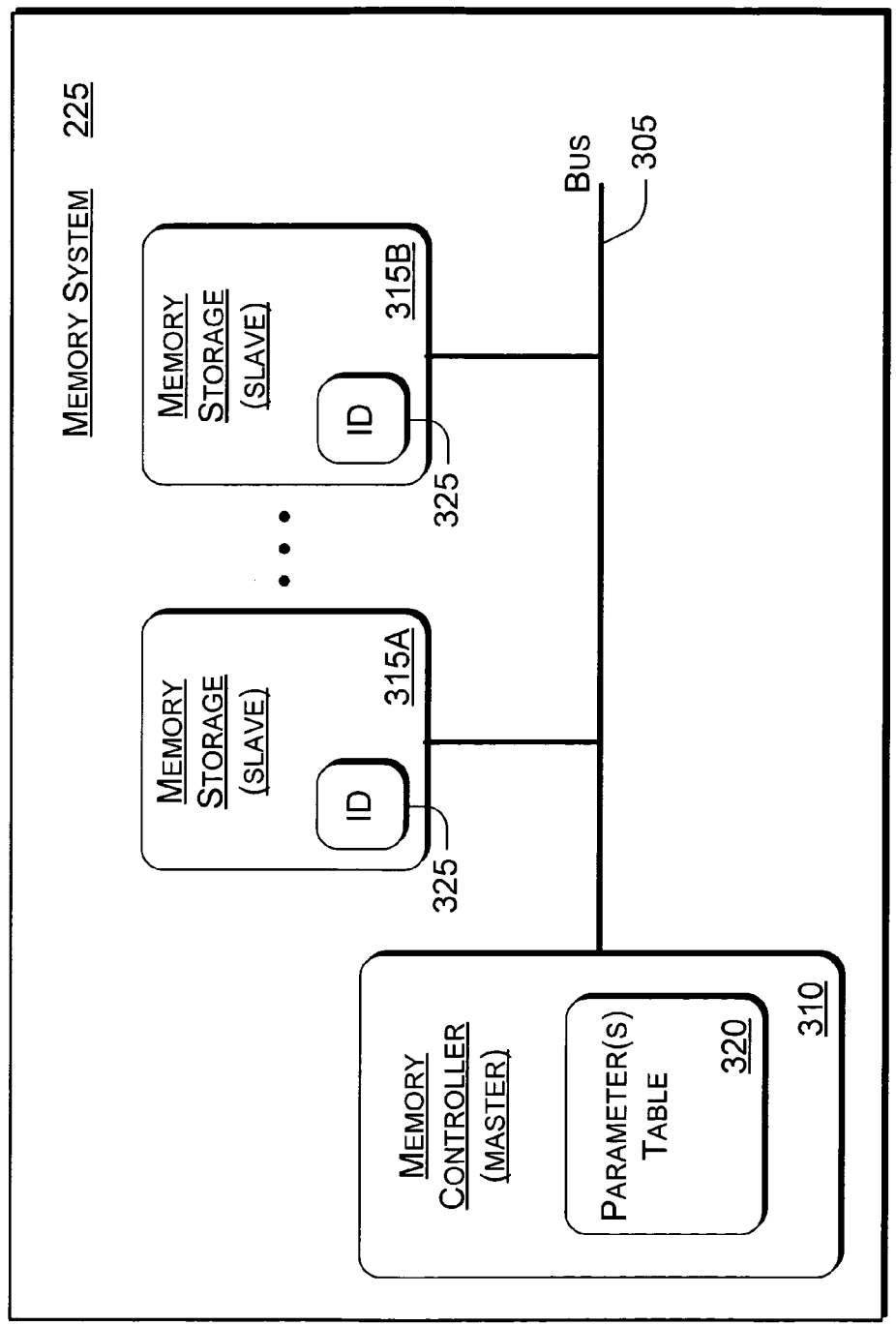
FIG. 3A illustrates an exemplary memory system having memory modules that are capable of signaling.

FIG. 3A illustrates an exemplary memory system 225 having memory modules 310 and 315 that are capable of signaling. In the described implementation, a memory controller module 310 is capable of communicating with memory storage modules 315A and 315B over a bus 305. The memory modules 310 and 315 may be discrete components such as ICs, and they are able to communicate over the bus 305 using signaling. The bus 305 may interconnect the memory modules 310 and 315 using any of many possible bus architectures and protocols. For example, the memory modules 310 and 315 may operate in a master-slave relationship, as labeled parenthetically. In such a relationship, the master engages in a bi-directional communication with any of multiple slaves, while each of the slaves communicates bi-directionally with the master. Consequently, any one or more of the memory modules 310 and 315 may comprise at least a receiving unit, and optionally a transmitting unit.

More specifically, in the exemplary implementation of FIG. 3A, a memory controller module 310 controls (e.g., controls reads from and writes to) one or more memory storage modules 315. Although only two such memory storage modules 315A and 315B are illustrated, three, four, or more memory storage modules 315 as indicated by the ellipses may alternatively be controlled by one or more memory controllers 310. The memory modules 310 and 315 form a memory system constructed and/or operating in accordance with any one or more of many different types of memory. These different types of memory include, but are not limited to, dynamic random access memory (DRAM), extended data out (EDO) DRAM, static random access memory (SRAM), synchronous DRAM (SDRAM), double data rate (DDR) SDRAM, Rambus® DRAM, and so forth.

Thus, the memory storage modules 315A and 315B each include multiple memory storage cells. (The memory controller 310 may also include storage cells, especially those used for buffering, such as caching, transfer latching, and so forth.) The memory controller 310 and the memory storage modules 315 may each include various control circuits to facilitate writing to and reading from the multiple memory storage cells.

Each of the memory storage modules 315 includes and/or corresponds to an identification (ID) 325. The ID 325 may be any form of identification that enables the memory controller 310 to locate and/or communicate with a particular memory storage module 315. For example, the ID 325 may be a code, a logical address, a physical place on the bus 305, an alpha and/or numeric designation, and so forth. If the designation is alphanumeric, the ID 325 may be unique on a memory system 225 level, on a computing system 200 level, on a general level (e.g., with respect to all such memory storage modules 315), and so forth. The memory controller 310 may also include an ID 325 (not explicitly shown).

To facilitate communication with the multiple memory storage modules 315, especially if they differ from one another by type, the memory controller module 310 may include a parameters table 320. The parameters table 320, or more generally a parameters data structure, includes multiple entries, with each entry having an ID 325 and associated attribute(s). The number of entries may correspond to the number of memory storage modules 315 with which the memory controller 310 may wish to communicate. Attributes related to a particular memory storage module 315 are associated with the ID 325 of that particular memory storage module 315 in and entry of the parameters table 320. Attributes may be related to a particular memory storage module 315 because of its general or specific memory type or because of an individual component analysis (e.g., as determined by analysis during a calibration period). Utilizing the attributes in the parameters table 320 (e.g., during an operational period) may enable and/or at least partially optimize communications with the memory storage modules 315.

Many of these memory modules 310 and 315 may also include differential and/or pseudo-differential receivers for internal and/or chip-to-chip data communications. Such memory modules, and the differential and/or pseudo-differential receivers, may therefore rely to varying degrees on various types of voltages, including reference voltages. In fact, correct and accurate operation thereof may depend on maintaining these voltages within very close tolerances.

Figure 3B:
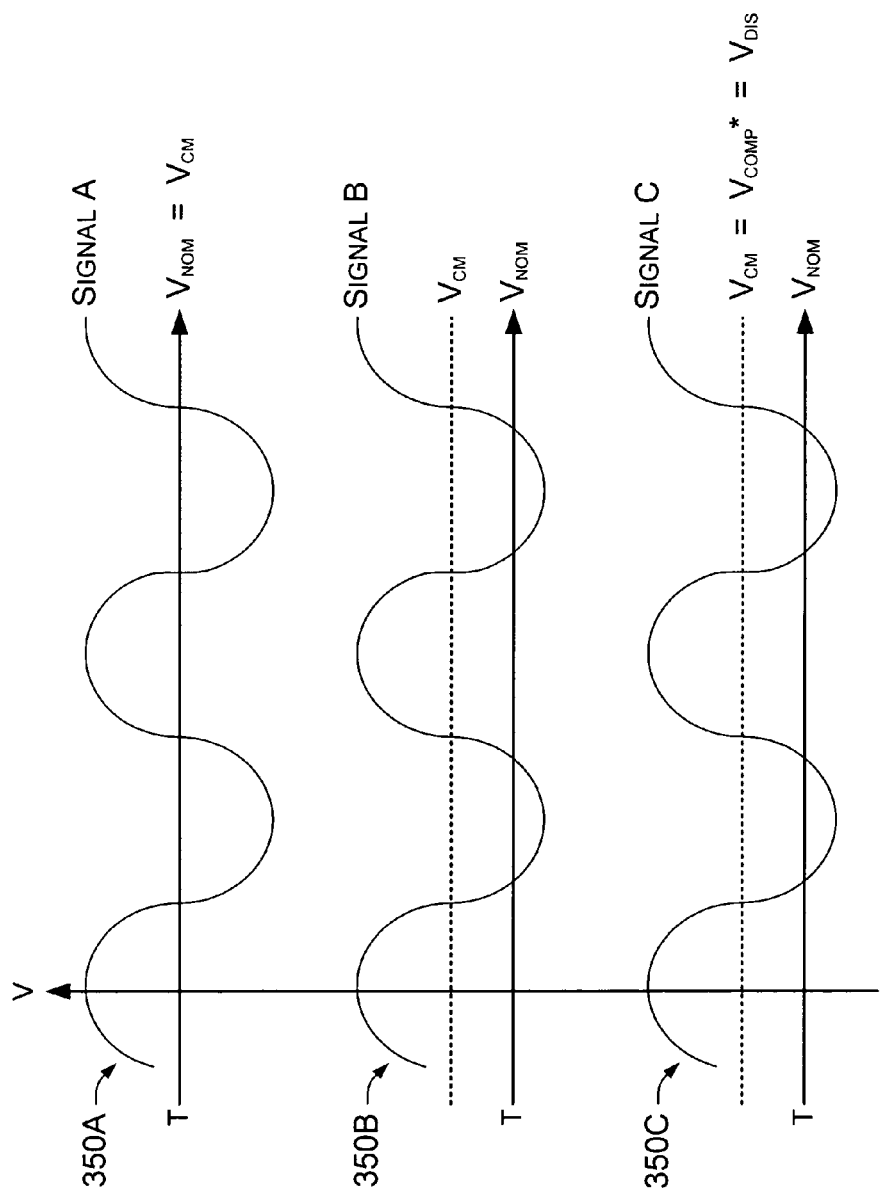
FIG. 3B illustrates exemplary data signaling graphs with accompanying voltage swings and voltage margins.

FIG. 3B illustrates exemplary data signaling graphs with accompanying voltage swings and voltage margins. Three data signaling graphs 350A, 350B, and 350C plot time [T] versus voltage [V] for three signals A, B, and C whose voltages are meaningful in comparison to a nominal reference voltage ($V_{NOM}$). In the graph 350A, the signal A has arrived at a receiving unit without any voltage attenuation or offset. Consequently, the common mode voltage ($V_{CM}$) of the signal A is equal to the nominal reference voltage ($V_{NOM}$). The common mode voltage may be considered as an average voltage of the incoming signal. For example, the common mode voltage point for a fifty percent (50%) duty cycle signal is in the center of the voltage swing. Because the nominal reference voltage is equal to the common mode voltage in the graph 350A, the full voltage swing (and hence the full timing margin) is available for correctly detecting/interpreting a received data signal.

Typically, however, signals do undergo voltage attenuation and/or offset prior to and while arriving at a receiving unit and/or a signal receiver. For example, in the graph 350B, the signal B has arrived at a receiving unit with no voltage attenuation but with a noticeable (and detectable) voltage offset. Consequently, the common mode voltage ($V_{CM}$) of the signal B does not equal the nominal reference voltage ($V_{NOM}$). As a result, the voltage margin on the lower side (the difference between $V_{NOM}$ and the lower extreme of signal B) is reduced, which can interfere with correct detection/interpretation of a received data signal.

The voltage margin that is otherwise reduced may be increased using a compensated voltage scheme when receiving the signaling. In the graph 350C, the signal C has also arrived at a receiving unit with no voltage attenuation but with noticeable and detectable voltage offset. Consequently, the common mode voltage ($V_{CM}$) of the signal C again does not equal the nominal reference voltage ($V_{NOM}$). However, signal receiver(s) that receive the signal C and a reference voltage are provided a compensated reference voltage ($V_{COMP}$*). The compensated reference voltage is set so that the actual reference voltage received at the signal receiver is approximately equal to the common mode voltage of the signal C. (The actual reference voltage received at the signal receiver is designated "$V_{DIS}$" in the graph 350C to reflect the "distributed voltage" terminology used below in FIG. 4A et seq.) Setting the actual reference voltage received at the signal receiver to be approximately equal to the common mode voltage of the signal has the effect of increasing the voltage swing (and the related timing margin) available for correct data signal detection and interpretation.

While not so limited, the schemes and techniques described herein are particularly useful for voltage compensation with ICs, especially those connected via high speed buses/channels. With ICs that are connected via high speed channels, the shrinking geometries of the ICs have resulted in interconnect traces having increasingly higher impedances, and the accelerating signaling frequencies of the channels have resulted in increasingly shorter timing margins. For example, as alluded to above with reference to FIGS. 1–3A, the subject matter described herein may be used to compensate voltages distributed or otherwise propagated between or among discrete components of PCBs, as well as other circuits.

The Applicants have found that these schemes and techniques may be particularly beneficial in various types of IC memory and PCB memory circuits, such as dynamic memory devices and boards, as described above with reference to FIG. 3A. Many high-speed memory technologies utilize differential and/or pseudo-differential signaling techniques, and it is particularly beneficial in these types of circuits to keep distributed voltages and signaling voltages within close tolerances.

Figure 4A:
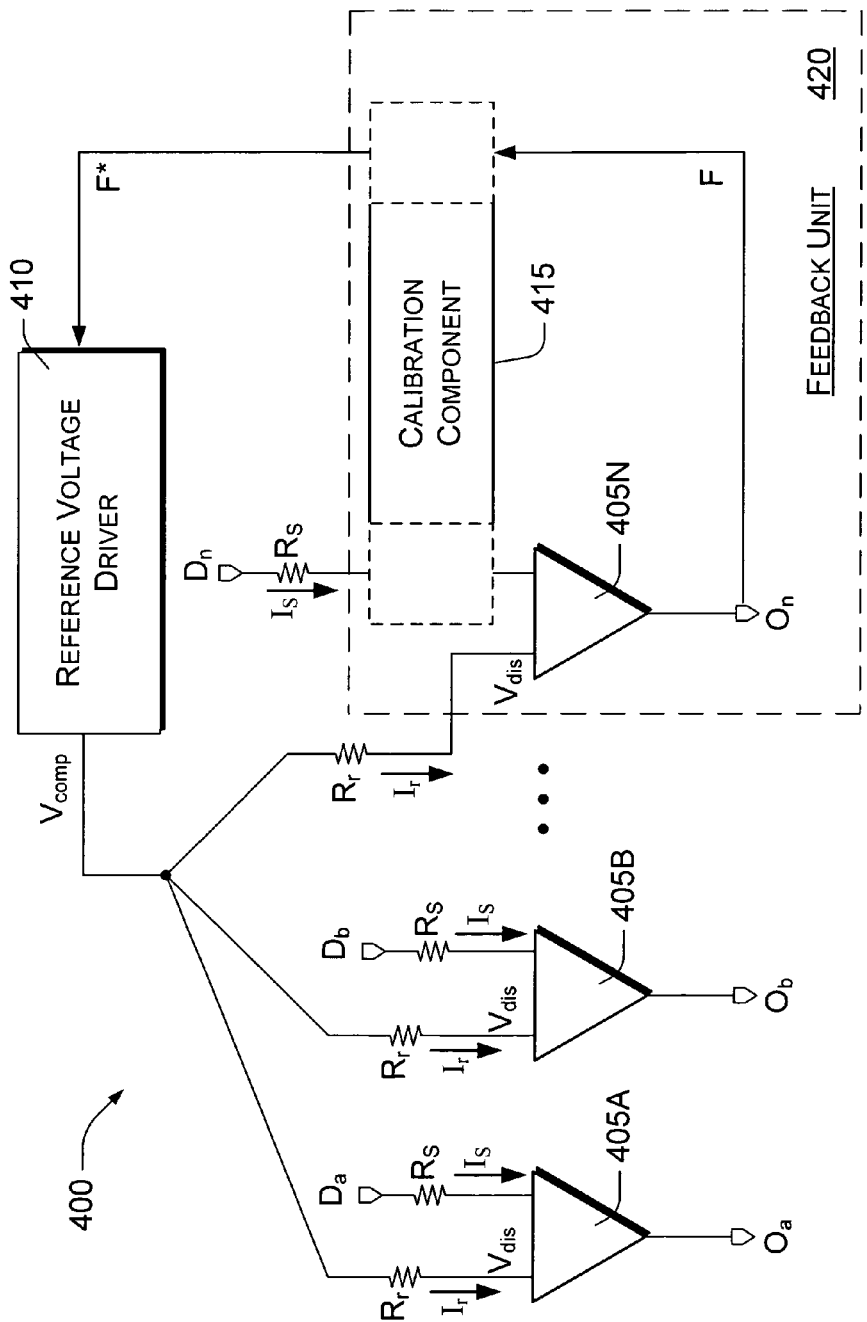
FIG. 4A illustrates an exemplary scheme for providing a compensated voltage when receiving signals.

FIG. 4A illustrates an exemplary scheme 400 for providing a compensated voltage when receiving signals. The elements of the scheme 400 may be part of a memory module 310/315 (of FIG. 3), a component 210–235 (of FIG. 2), or more generally a receiving unit 115 (of FIG. 1). Thus, the scheme 400 may be implemented as an IC using, for example, a semiconductor processing technology, such as CMOS and bipolar processing technologies, as well as by other present and future circuit technologies. Also, the scheme 400 may alternatively be implemented using a printed circuit board (utilizing for example PCB fabrication technology) and/or using discrete devices.

Generally, in the described implementation, the scheme 400 includes a reference voltage driver 410, one or more components 405, and a feedback unit 420. These elements form a feedback system that compensates for at least some of the voltage changes that can occur to a signal. The reference voltage driver 410 supplies a compensated reference voltage $V_{comp}$ to the components 405. At the components 405, the supplied voltage comprises a distributed reference voltage $V_{dis}$. The components also receive data signals D to be compared to the distributed reference voltage $V_{dis}$ in pseudo-differential fashion. A desirable voltage margin for determining the data in the data signals D is attained at the components 405 when the common mode voltage of the data signals D at the components is equal to the distributed reference voltage $V_{dis}$. Unfortunately, they are frequently not equal absent intervention. The feedback unit 420, however, remedies or ameliorates this inequality by adjusting, at least indirectly, the distributed reference voltage $V_{dis}$ so that it is approximately equal to the common mode voltage of the data signals D at the components 405. The feedback unit 420 is typically active during calibration/initialization phases and inactive during operational phases.

More specifically, the one or more components 405 operate with reference to distributed reference voltages. In the described implementation, the components 405 comprise means for evaluating a plurality of data signals relative to a distributed reference voltage. More specifically, such means comprise a plurality of signal receivers, designated by reference numerals 405A, 405B, through 405N. The signal receivers 405 are configured to evaluate corresponding signals $D_a$, $D_b$, through $D_n$ relative to the distributed reference voltage $V_{dis}$. Although three signals and three signal receivers are shown in FIG. 4A, the principles described herein may be implemented with any number of signals and signal receivers, as indicated by the ellipses and the "N/n" suffixes.

Although the signal receivers shown in FIG. 4A can be of different types, the described implementation utilizes differential data receivers, each of which compares two input voltages and produces a binary output signal as a function of which of the voltages is greater. The binary output signals are designated in FIG. 4A as $O_a$, $O_b$, through $O_n$, while the respective received data signals that are being compared are designated as $D_a$, $D_b$, through $D_n$. In the configuration shown, a first of the two inputs of a particular signal receiver 405 receives distributed reference voltage $V_{dis}$. The second of the two inputs receives a data signal D, which is specified and evaluated relative to $V_{dis}$ to represent a binary value. For example, a binary "1" might represent a data signal D that is greater than $V_{dis}$, while a binary "0" might represent a data signal D that is less than $V_{dis}$. Alternatively, a different (e.g., an opposite) logic assignment may be employed.

The scheme 400 further comprises driver means having a variable voltage gain for producing a compensated reference voltage. Such driver means in the described embodiment comprises a reference voltage driver 410 that produces a compensated reference voltage $V_{comp}$. Routing means are provided for routing the compensated reference voltage $V_{comp}$ (e.g., on an IC) to form the distributed reference voltage $V_{dis}$ at the signal receivers 405. Specifically, the compensated reference voltage $V_{comp}$ is routed on the IC through signal lines (e.g., traces) to the individual signal receivers 405. At the signal receivers 405, the voltage comprises the distributed voltage $V_{dis}$.

Compensated reference voltage $V_{comp}$ is subject to signal degradations such as noise coupling and voltage changes over the lengths of the traces. The degraded reference voltage is what is received by components 405A through 405N; therefore, $V_{dis}$ is a degraded or voltage-changed version of $V_{comp}$. Depending on the direction of current leakage, $V_{dis}$ might be either higher or lower than $V_{comp}$. In a circuit where the input stages of components 405A through 405N sink current, the voltage degradation of $V_{dis}$ will normally correspond to a voltage drop relative to $V_{comp}$. In circuits where the input stages of components 405A through 405N source current, the voltage degradation of $V_{dis}$ will normally correspond to a voltage increase relative to $V_{comp}$.

More specifically, the distribution traces have finite resistances or impedances along their lengths that contribute to the degradation or voltage change of distributed reference voltage $V_{dis}$ with respect to $V_{comp}$. Such resistances are represented in FIG. 4A by finite resistor elements $R_r$, although it should be recognized that the resistances are distributed along the lengths of the traces rather than being discrete elements. Also, each of the resistance values that are designated by $R_r$ ordinarily differ from each other, at least slightly. Furthermore, signal receivers 405 have input characteristics that contribute to the degradation of distributed reference voltage $V_{dis}$. Such input characteristics typically include finite input impedances and/or leakage currents.

Specifically, the signal receivers 405 have first input leakage currents that are represented in FIG. 4A by the symbol $I_r$. It should be noted that although the leakage currents $I_r$ typically result from input characteristics of the signal receivers 405 such as CMOS gate leakage, they could also be due to other factors. For example, some circuits might utilize an input capacitance to reduce high-frequency noise or to perform some other function. Such an input capacitance can be an additional source of leakage current. Furthermore, leakage currents $I_r$ might be either positive or negative, depending on whether the signal receiver input is a current source or a current sink. In a circuit implemented with bipolar transistor technology, for example, a receiver input might comprise the base of a bipolar transistor. If the transistor is an NPN transistor, there will normally be a positive base current into the receiver input. If the transistor is a PNP transistor, on the other hand, the base will typically source a negative base current.

As discussed above in the "Background" section, trace resistances and leakage currents can be a significant cause of voltage signal degradation, including reference voltage signal degradation. Specifically, these factors can cause a voltage change in distributed reference voltage $V_{dis}$ relative to compensated reference voltage $V_{comp}$ (either an increase or a decrease, depending on the direction(s) of the leakage currents $I_r$). This voltage change is at least partially a function of the lengths of the traces and the input characteristics of the signal receivers 405.

Compensated reference voltage $V_{comp}$ may be distributed in a star, Kelvin, length-matched, or impedance-matched configuration to approximately equalize signal degradations in distributed reference voltage $V_{dis}$ as it is received by the various signal receivers. In addition, data signals D are typically routed in a fashion similar to that of the distributed reference voltage $V_{dis}$ so that the data signals D are subject to approximately the same degradations as distributed reference voltage $V_{dis}$. A signal, including data signals, may be considered to start as an original version of the signal. After degradations thereto, the degraded signal may be considered a degraded version of the signal. Furthermore, after a signal has been offset or had a common mode adjustment, the altered signal may be considered as yet another version of the signal. Hence, as a signal experiences various changes, different versions of the signal may be produced.

Generally, the various signal paths to the inputs of the signal receivers 405 are designed to have matching impedances, to result in similar voltage degradations over the lengths of the signal paths. In situations where the respective conductors or traces that convey $V_{dis}$ to the various signal receivers have approximately the same physical and/or electrical characteristics (e.g., similar conductive metal, width, and thickness), the conductors are simply length-matched to achieve such impedance matching. In many cases, the signal paths or conductors may be considered to be matched if their impedances fall within approximately 10% of each other, although various circuits might require more or less matching precision, depending on the nature of the circuits and process technologies utilized. In some applications, on the other hand, it may be desirable to match impedances to within 1%.

Thus, due to matching impedances and current flows across the multiple traces, each distributed voltage $V_{dis}$ is approximately equal to the other distributed voltages $V_{dis}$. Because of the various degrading factors, each distributed voltage $V_{dis}$ is the "actual" reference voltage provided to the signal receivers, and it may be considered a version of the compensated reference voltage $V_{comp}$ as modified by interconnect trace and other effects between the point of generation of the compensated reference voltage $V_{comp}$ and the point of supply to the signal receivers.

It is therefore this distributed voltage $V_{dis}$ that is set equal to a common mode voltage of a received signal D to improve the voltage margin. In other words, by setting a modified version of the compensated reference voltage $V_{comp}$ (i.e., the distributed voltage $V_{dis}$ in this context) equal or approximately equal to the common mode voltage of the received signal, the voltage swing (and the related timing margin) that is available for correct data signal detection and interpretation may be increased. To achieve this, the compensated reference voltage $V_{comp}$ is directly adjusted, and the distributed reference voltage $V_{dis}$ is consequentially indirectly adjusted, to account for the variations in the common mode voltages of the received signals.

These variations in the common mode voltage of the received signals D are due to a number of factors that are frequently not easy to predict and/or to remove through passive design in an IC chip or an IC system. For example, as also described above, the common mode voltage of a received signal may differ from that of the "best known" or designed-for signal receiver input voltage due to any one or more of a number of factors, including the following: the duty cycle of the signal, an asymmetry of the output transmitter (e.g., of a transmitting unit), a difference in output waveform edge rate, channel loading, and so forth.

The above factors can cause a loss of system margin due to unbalanced signaling. In the implementation illustrated in FIG. 4A, these and other factors that affect received signaling are represented by the resistor elements $R_S$ and the second input leakage current elements $I_S$. It should be recognized that the "resistances" may actually be more-electrically-complex impedances and that they are distributed from the transmitting unit, along an interconnecting channel, and to/into the receiving unit, rather than being discrete elements. Also, each of the resistance values that are designated by $R_S$ ordinarily differ from each other, at least slightly.

Furthermore, the signal receivers 405 have input characteristics that also contribute to the degradation of the received signal D. Such input characteristics typically include finite input impedances and/or leakage currents (e.g., that create or contribute to the second input leakage currents $I_S$) that are also represented by the resistors $R_S$ and the second input leakage currents $I_S$. Again, it should be noted that although the leakage currents $I_S$ typically result from input characteristics of the signal receivers 405 such as CMOS gate leakage, they could also be due to other factors, including those external to the receiving unit. In short, the factors affecting the integrity of the received signals D, as represented by the resistors $R_S$ and the second input leakage currents $I_S$, may actually be fully or partially created external to the receiving unit. It is these factors affecting the integrity of the received signals D that lead to variances in the common mode voltage of the received signals D.

In FIG. 4A et seq., compensation for these variances of the common mode voltage of the received signals D is accomplished through voltage adjustment. In the described implementation, the voltage that is ultimately adjusted to achieve the compensation is the distributed reference voltage $V_{dis}$ at the signal receivers 405. The distributed reference voltage $V_{dis}$ is adjusted so that it approximately equals the common mode voltage of the received signals D at the signal receivers 405. The distributed reference voltage $V_{dis}$ is indirectly adjusted as a result of the direct adjustment of the compensated reference voltage $V_{comp}$ by the reference voltage driver 410. The reference voltage driver 410 compensates the compensated reference voltage $V_{comp}$ responsive to a feedback signal F*, which is produced by the feedback unit 420 during calibration/initialization periods. The feedback unit 420 receives as input the distributed reference voltage $V_{dis}$ and the data signal $D_n$, which are used to produce as output the feedback signal F*.

There is therefore a feedback loop that compensates for "non-ideal" common mode voltage values of the received signals D at the signal receivers 405 by setting the distributed reference voltage $V_{dis}$ approximately equal to the common mode voltage value of the received signal $D_n$. Describing this feedback loop in the other direction, the feedback unit 420 receives as input the distributed reference voltage $V_{dis}$ and the received data signal $D_n$. The feedback unit 420 produces the feedback signal F* responsive to these two inputs and a comparison involving an expected data value, examples of which are provided in the following paragraph. Using the feedback signal F*, the reference voltage driver 410 directly adjusts/modifies the compensated voltage $V_{comp}$ and therefore indirectly adjusts the distributed voltage $V_{dis}$. The distributed voltage $V_{dis}$ is adjusted so as to approximate the common mode voltage $V_{cm}$ (not explicitly shown in FIG. 4A) of the received data signal $D_n$. The common mode voltage $V_{cm}$ of the received data signal $D_n$ is therefore determined using the feedback unit 420 and the reference voltage driver 410.

In one implementation, the expected data value, used as part of an internal comparison within the feedback unit 420 to produce the feedback signal F*, comprises a predetermined test value. More generally, the expected data value might be based on operational measurements; on a data value that is provided (e.g., from a transmitting unit) to the receiving unit, including to the feedback unit 420 or other control circuitry; on a data value that has been provided (e.g., to a transmitting unit) from the receiving unit, including from the feedback unit 420 or other control circuitry; and so forth. More specifically, but by way of example only, a receiving unit employing the scheme 400 of FIG. 4A may send a data value to a transmitting unit and then request that the transmitting unit return the data value to the receiving unit by transmitting it back as a data signal. The received data signal, or a derivative thereof, may then be compared to an expected data value, which may be derived from the data value sent to the transmitting unit. Particular exemplary expected data values and/or aspects thereof are described herein with reference to FIGS. 9A, 9B, 10A, and 10B.

In the described implementation, the feedback unit 420 includes at least one signal receiver 405N and one or more calibration components 415. The signal receiver 405N has first and second inputs and one output. The first input receives the distributed voltage $V_{dis}$, and the output provides output signal $O_n$. The signal received by the second input of the signal receiver 405N depends on which of two embodiments the feedback unit 420 is operating under. The first and second embodiments are determined based on where and how the calibration component 415 is located and operating. The two options are reflected diagrammatically by the left and right dashed extensions of the calibration component 415 in FIG. 4A.

In the first embodiment of the implementation of FIG. 4A, the calibration component 415 is located prior to the second input of the signal receiver 405N. The calibration component 415 in this first embodiment receives as input the received signal $D_n$ and provides as output the second input to the signal receiver 405N. The output $O_n$ of the signal receiver 405N is the feedback signal F. In this first embodiment, the feedback signal F, without further modification, also forms the feedback signal F*, which is received by the reference voltage driver 410.

In the second embodiment of the implementation of FIG. 4A, the calibration component 415 is located after the output $O_n$ of the signal receiver 405N. The signal receiver 405N in this second embodiment receives as its second input the received signal $D_n$ and produces as its output $O_n$ the feedback signal F. The calibration component 415 receives as input the feedback signal F and provides as output the feedback signal F*, which is received by the reference voltage driver 410. Additional details regarding the first and second embodiments of the calibration component 415 are described below with reference to FIG. 5 et seq.

In the described implementations, the "feedback" signal receiver 405N of the feedback unit 420 comprises one signal receiver of the (usually) multiple signal receivers 405. In other words, a "standard" signal receiver 405 is used as the feedback signal receiver 405N, with the feedback signal receiver 405N having the same or similar electrical characteristics as the other signal receivers 405. When a "standard" signal receiver 405 is shared for the feedback unit 420, the input thereto may have the calibration component 415 isolated to match the other "standard" signal receivers 405 in terms of loading during the initialization period(s).

Other implementations, however, might utilize a "special" or dedicated additional signal receiver as a feedback component during initialization period(s). To accomplish this, the data signal $D_n$ may be diverted, re-routed, and/or otherwise shunted to an input of such a "special" dedicated additional signal receiver during initialization, along with the distributed voltage $V_{dis}$ to another input thereof. During normal operational periods, the "special" dedicated additional signal receiver can be dormant. Alternatively, calibration may occur constantly using a dedicated signal receiver that constantly receives a calibration signal from the transmitting unit under consideration on a dedicated connection (e.g., line or bus) between that transmitting unit and the signal receiver of the receiving unit.

Figure 4B:
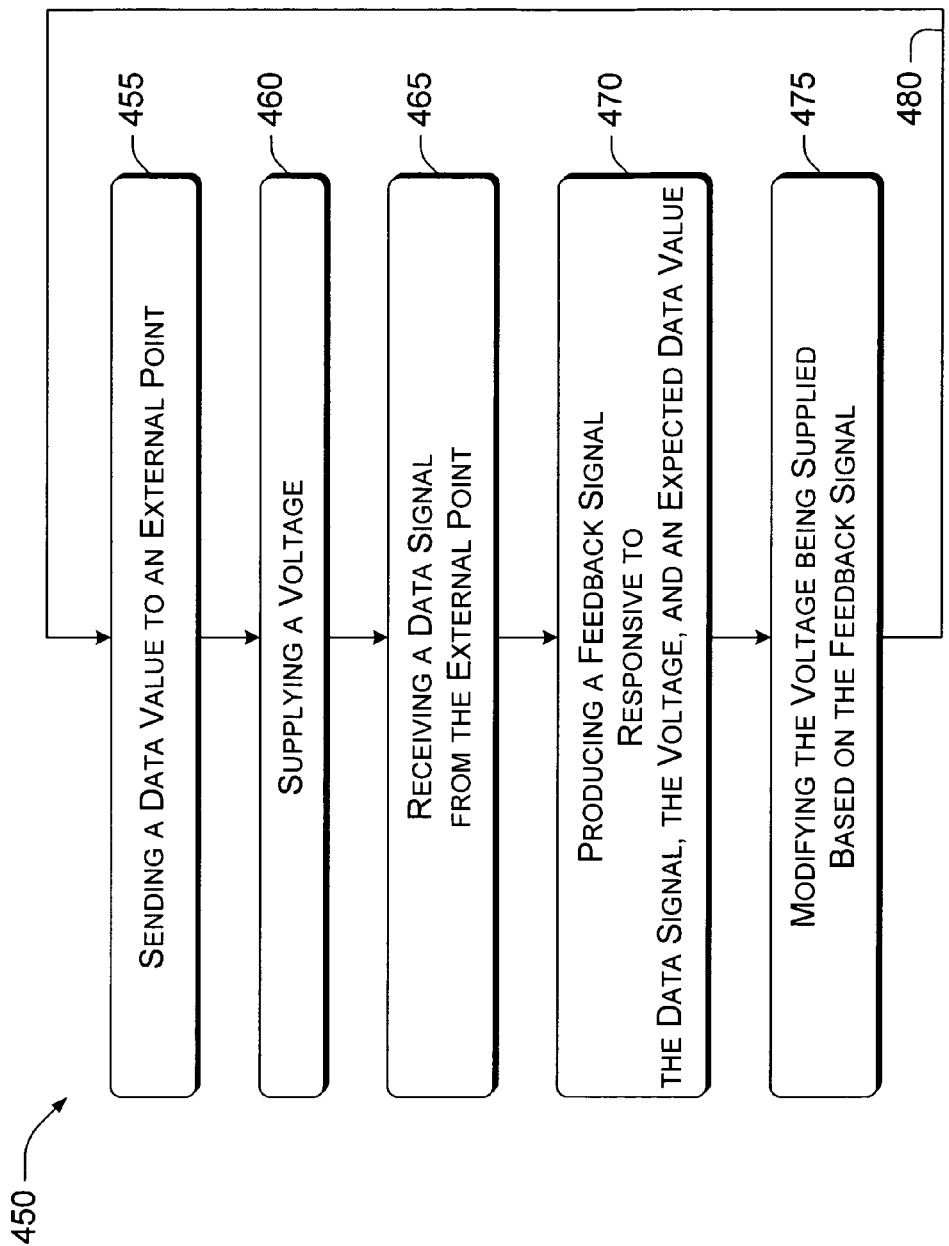
FIG. 4B illustrates an exemplary method in flowchart form for providing a compensated voltage when receiving signals.

FIG. 4B is a flowchart illustrating an exemplary method for providing a compensated voltage when receiving signals. The flowchart 450 includes actions 455–475 that are directed to an initialization/calibration phase where compensation values and/or levels are being initially determined. These actions 455–475 may be performed in an order other than that illustrated and/or fully or partially (substantially) simultaneously. Actions of the flowchart 450 may be performed in a receiving unit, whether the receiving unit be a discrete part, an IC, a component on a PCB, a memory system, a computer, and so forth. Furthermore, the actions 455–475 are described below with reference to the hardware already described in FIG. 4A, but they can be performed by other hardware.

An action 455 comprises sending an expected or predetermined data value to an external point. This data value can be sent from a receiving unit (having transmitting functionality, too) that includes the scheme 400. The external point can be a transmitting unit (having receiving functionality, too). Both of the receiving unit and the transmitting unit can be a discrete part, an IC, a component on a PCB, a memory system, a computer, and so forth.

An action 460 comprises supplying a voltage. The voltage can comprise the distributed reference voltage $V_{dis}$ being supplied to the receiving unit 405N. (The voltage can "initially" be supplied by the reference voltage driver 410 as the compensated reference voltage $V_{comp}$.) An action 465 comprises receiving a data signal from the external point. The data signal may be sent from the transmitting unit based on the predetermined data value that was previously sent thereto, and it may be received at the receiving unit as the signal $D_n$. An action 470 comprises producing a feedback signal responsive to the data signal, the supplied voltage, and an expected data value. The expected data value may be the predetermined data value that was previously sent to the transmitting unit, a derivative thereof, an attribute of a signal carrying the predetermined data value, and so forth. Thus, the expected data value can comprise, for example, a voltage level, a binary value, and so forth. The feedback signal may be the feedback signal F* that is output from the feedback unit 420.

An action 475 comprises modifying the voltage being supplied in the action 460 based on the feedback signal. In the described implementation, the reference voltage driver 410 receives the feedback signal F* and modifies the voltage output therefrom (the compensated reference voltage $V_{comp}$), which is a version of the distributed reference voltage $V_{dis}$. An arrow 480 leads from the action 475 back around to the action 455 to indicate that all or some of the actions 455–475 may be repeated during an initialization period, until the supplied voltage reaches a satisfactory level. The supplied voltage, $V_{dis}$, may be considered to have reached a satisfactory level when it becomes approximately equal to the common mode voltage of the received signal $D_n$, as is described further below. As an example of the feedback cycle represented by the arrow 480, actions 460–475 may be repeated after action 455 is performed once (e.g., optionally with repeated instructions from the receiving unit to the transmitting unit to send the data signal).

Figure 5:
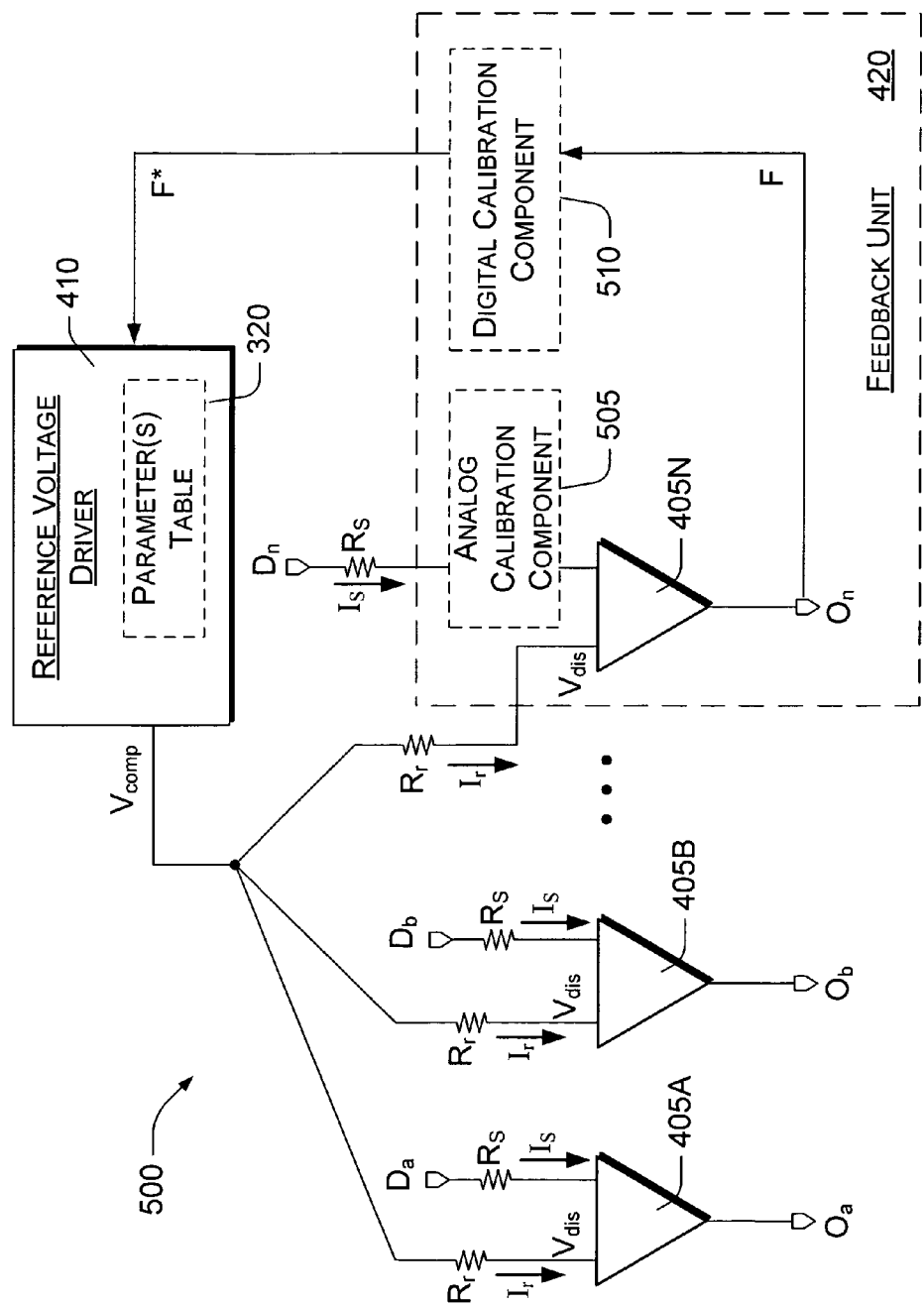
FIG. 5 illustrates multiple exemplary approaches to implementing the exemplary scheme for providing a compensated voltage when receiving signals.

FIG. 5 illustrates multiple exemplary approaches to implementing the exemplary scheme 500 for providing a compensated voltage when receiving signals. The implementations shown in FIG. 5 include an analog calibration component 505, a digital calibration component 510, and/or the parameters table 320 (also illustrated in FIG. 3A). Each may be used individually or in conjunction with one or more of the others. For example, either the analog calibration component 505 or the digital calibration component 510 may be utilized in conjunction with the parameters table 320. Although the analog calibration component 505 and the digital calibration component 510 may be utilized together for confirmation or other synergistic purposes, it is more likely that only one or the other is implemented in any single receiving unit. In other words, it is more likely that only the analog calibration component 505 or the digital calibration component 510 (with or without a parameters table 320) is implemented within any given feedback unit 420.

It should be understood that the feedback unit 420 is active during initialization/calibration to determine calibration values and/or levels. During operational periods, however, the feedback unit 420 is inactive. Thus, if the signal receiver 405N is shared for normal operational signal reception, the received signal $D_n$ is passed unchanged to the second input of the signal receiver 405N during such operational periods. The parameters table 320, on the other hand, can be active during both calibration periods and operational periods. During calibration the parameters table 320 receives determined calibration values, and during normal operation the parameters table 320 provides such calibration values for use in receiving signaling.

As is described above with reference to FIG. 3A, the parameters table 320 includes multiple entries, with each entry including an ID and associated attribute(s) for each transmitting unit from which data signals are to be received. Utilizing one or more of the attributes in a receiving unit facilitates the correct interpretation of information that is received in data signals from transmitting units. When a signal is to be received or is being received from a particular transmitting unit having a particular ID, the entry in the parameters table 320 that includes that particular ID is accessed and at least one associated attribute is extracted therefrom. The ID serves to identify a source (or destination) of a signal, as is described above with reference to FIG. 3A. The associated attribute may be a compensation value, and it may indicate a level at which the voltage driver 410 should drive the compensated voltage $V_{comp}$ to achieve a given distributed voltage $V_{dis}$. The given distributed voltage $V_{dis}$, from previous calibration efforts, is known to approximately equal the common mode voltage of data signals D from the identified signal source.

More generally, a compensation value is a register value or another value that is capable of storing information that may set or modify a voltage (or other changeable attribute such as timing). In an implementation of the scheme 500 in FIG. 5, each compensation value is used by the reference voltage driver 410 to set/modify the compensated voltage $V_{comp}$. A particular compensation value is selected and activated for utilization by the reference voltage driver 410 whenever the receiving unit employing the scheme 500 is to be receiving signaling from a particular transmitting unit having the ID that is associated with that particular compensation value in an entry of the parameters table 320.

Additional exemplary implementations for the parameters table 320 are described below with reference to FIGS. 11A, 11B, and 11C. In the scheme 500, compensation values for the parameters table 320 are determined using the analog calibration component 505 or the digital calibration component 510, which are described below.

As is described above with reference to FIG. 4A, the calibration component 415 may be located either before an input of the signal receiver 405N in a first embodiment or after the output of the signal receiver 405N in a second embodiment. In the implementations shown in FIG. 5, these first and second embodiments of the calibration component 415 are illustrated as the analog calibration component 505 and the digital calibration component 510, respectively. Hence, when the calibration is operating under an analog approach, the calibration is effectuated using the analog calibration component 505. When the calibration is operating under a digital approach, the calibration is effectuated using the digital calibration component 515. In other words, usually only the analog calibration component 505 or the digital calibration component 510 will be implemented within a given embodiment of feedback unit 420.

When determining a compensation value using the analog calibration component 505 and no digital calibration component 510, the feedback signal F* is identical to and unchanged from the feedback signal F (excepting effects caused by trace impedance, etc.). In this embodiment, the feedback unit 420 is configured so that it produces a feedback signal F/F* that is positive or logically true when the distributed voltage $V_{dis}$ is less than the common mode voltage $V_{cm}$ (of a received data signal $D_n$) and negative or logically false when the distributed voltage $V_{dis}$ is greater than the common mode voltage $V_{cm}$. The common mode voltage $V_{cm}$ of the received data signal $D_n$ is determined using analog elements of the analog calibration component 505 and provided as the second input to the signal receiver 405N, as is described in greater detail below with reference to FIGS. 9A and 9B.

The signal receiver 405N compares the distributed voltage $V_{dis}$ to the common mode voltage $V_{cm}$ of the received signal $D_n$ to produce a result from which it may be determined whether an expected value has been properly received with the received data signal $D_n$. The result from the signal receiver 405N is the output $O_n$, which is the feedback signal F/F* in the analog calibration embodiment. The reference voltage driver 410 is configured to respond to the feedback signal F/F* by increasing the compensated voltage $V_{comp}$ when the feedback signal F/F* is true and decreasing the compensated voltage $V_{comp}$ when the feedback signal F/F* is false. The result is that the compensated voltage $V_{comp}$ is increased when $V_{dis} < V_{cm}$ and decreased when $V_{dis} > V_{cm}$. This ensures that the distributed voltage $V_{dis}$ becomes (or remains) approximately equal to the common mode voltage $V_{cm}$. Exemplary manner(s) for determining whether a comparison involves an expected value and for controlling the reference voltage driver 410 accordingly are described below with reference also to FIGS. 9A and 9B.

In an alternative implementation, the feedback unit 420 is configured so that it produces a feedback signal F/F* that is negative or logically false when the distributed voltage $V_{dis}$ is less than the common mode voltage $V_{cm}$ and positive or logically true when the distributed voltage $V_{dis}$ is greater than the common mode voltage $V_{cm}$; and the reference voltage driver 410 is configured to respond to the feedback signal F/F* by increasing the compensated voltage $V_{comp}$ when the feedback signal F/F* is false and by decreasing the compensated voltage $V_{comp}$ when the feedback signal F/F* is true. Again, positive logic, negative logic, or some combination thereof may be selected and implemented for the described schemes and techniques.

In the second embodiment of the calibration component 415, the compensation value is determined using the digital calibration component 510. With no analog calibration component 505, the received data signal $D_n$ is fed directly into the signal receiver 405N without modification by any calibration component 415. Also, the feedback signal F is analyzed and possibly changed by the digital calibration component 510 to produce the feedback signal F*. When employing a digital calibration component 510, the feedback unit 420 is configured to determine high and low compensated voltage $V_{comp}$ failure points in conjunction with the reference voltage driver 410. The mid-point between these high and low compensated voltage $V_{comp}$ failure points may be considered the desired compensated voltage $V_{comp}$. This mid-point compensated voltage $V_{comp}$ is desired because a distributed version thereof, the distributed voltage $V_{dis}$, is approximately equal to the common mode voltage $V_{cm}$ of the received data signal $D_n$. Thus, using this mid-point compensated voltage $V_{comp}$ improves the likelihood of attaining a voltage swing (and hence a corresponding timing margin) at which the receiving unit (and optionally the transmitting unit) have been designed to operate, especially at the signal receiver(s) 405.

The reference voltage driver 410 is configured to respond to the feedback signal F* by increasing the compensated voltage $V_{comp}$ when the feedback signal F* is positive or logically true and decreasing the compensated voltage $V_{comp}$ when the feedback signal F* is negative or logically false. For determining a high compensated voltage $V_{comp}$, the digital calibration component 510 of the feedback unit 420 is therefore configured to maintain the feedback signal F* as positive as long as there is no receiving failure. Consequently, the feedback signal F* is produced as positive or logically true when a comparison (e.g., at the signal receiver 405N) of the distributed voltage $V_{dis}$ to the received data signal $D_n$ provides an expected result. For determining a low compensated voltage $V_{comp}$, the digital calibration component 510 of the feedback unit 420 is therefore configured to maintain the feedback signal F* as negative as long as there is no receiving failure. Consequently, the feedback signal F* is produced as negative or logically false when a comparison (e.g., at the signal receiver 405N) of the distributed voltage $V_{dis}$ to the received data signal $D_n$ provides an expected result.

The digital calibration component 510 determines whether an expected value results from the comparison by knowing what the (e.g., binary) value(s) of the received data signal $D_n$ "should be". The value(s) of the received data signal $D_n$ may be a single (e.g., repeated) binary value or a string of binary values (e.g., of a predetermined length such as eight (8) bits). Consequently, while the digital calibration component 510 determines that the received data signal $D_n$ continues to provide the expected binary value, it continues to maintain the feedback signal F* at its current logical value. When, on the other hand, such a comparison of the distributed voltage $V_{dis}$ to the received data signal $D_n$ does not provide the expected result, the digital calibration component 510 considers this a receiving failure and notes the compensated voltage $V_{comp}$ as an extreme, whether it be a high or low extreme. Exemplary manner(s) for determining whether a result is expected, for noting the compensated voltage $V_{comp}$ extremes, and for controlling the reference voltage driver 410 accordingly are described below with reference to FIGS. 10A and 10B.

In an alternative implementation, the reference voltage driver 410 is configured to respond to the feedback signal F* by decreasing the compensated voltage $V_{comp}$ when the feedback signal F* is positive or logically true and increasing the compensated voltage $V_{comp}$ when the feedback signal F* is negative or logically false. For determining a high compensated voltage $V_{comp}$, the digital calibration component 510 of the feedback unit 420 is therefore configured to maintain the feedback signal F* as negative as long as there is no receiving failure. Correspondingly, for determining a low compensated voltage $V_{comp}$, the digital calibration component 510 of the feedback unit 420 is therefore configured to maintain the feedback signal F* as positive as long as there is no receiving failure. Again, positive logic, negative logic, or some combination thereof may be selected and implemented for the described schemes and techniques.

Figures 6, 7:
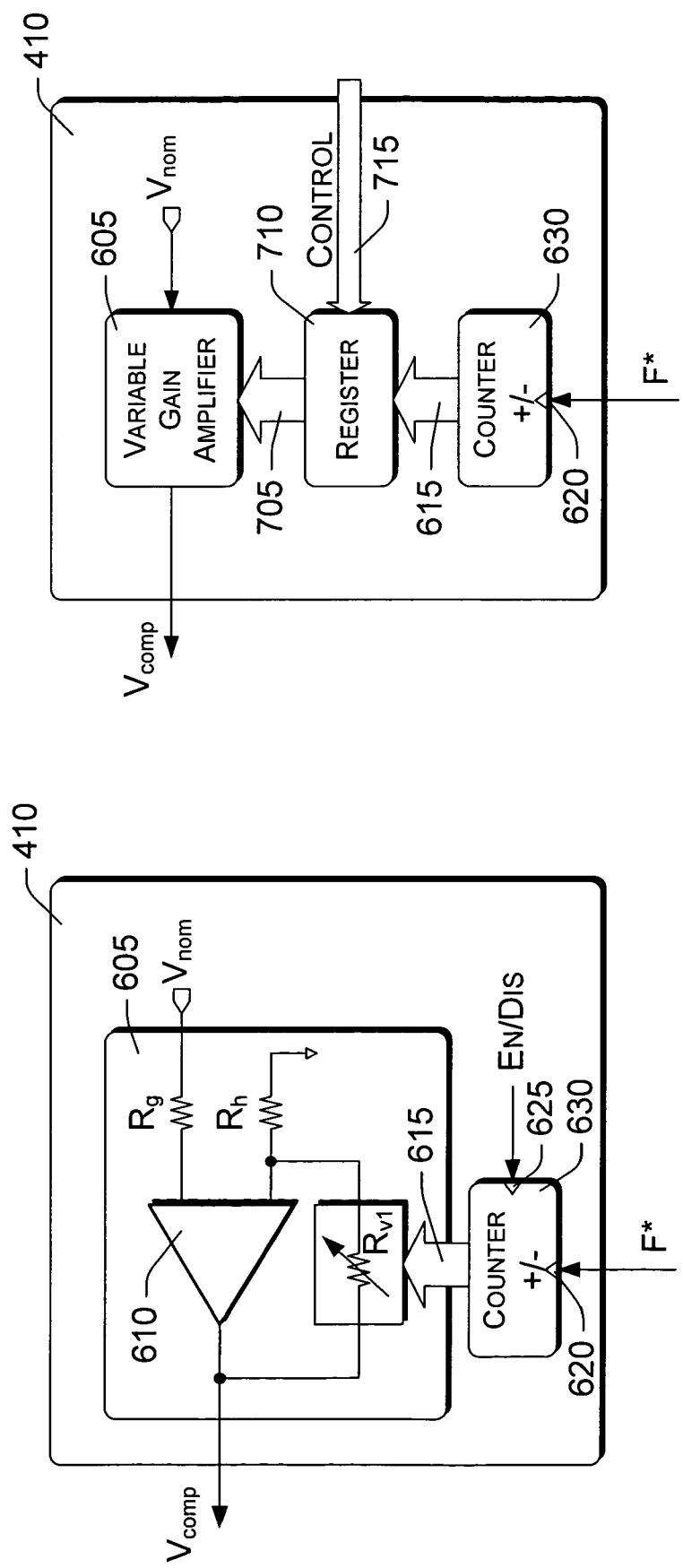
FIG. 6 is a schematic view of an exemplary implementation of a reference voltage driver such as may be used in the scheme of FIG. 4A et seq.
FIG. 7 is a schematic view of another exemplary implementation of a reference voltage driver such as may be used in the scheme of FIG. 4A et seq.

FIG. 6 is a schematic view of an exemplary implementation of a reference voltage driver 410 such as may be used in the scheme of FIG. 4A et seq. In this implementation, the voltage driver 410 comprises an increment/decrement component or up/down counter 630 and a variable gain amplifier 605. Generally, up/down counter 630 is configured to increment and decrement a digital value 615 depending on the relationship of the distributed reference voltage $V_{dis}$ and the data signal $D_n$ (or a derivative thereof such as the common mode voltage of the data signal $D_n$), as indicated by feedback signals F and F*.

Specifically, counter 630 increments value 615 when $V_{dis} < V_{cm}$ and decreases value 615 when $V_{dis} > V_{cm}$, in an analog calibration approach for example. Even more specifically, up/down counter 630 has an up/down or +/−input 620 that receives feedback signal F*. When feedback signal F* is logically true, the counter periodically increments digital output value 615. When feedback signal F* is logically false, the counter periodically decrements digital output value 615. The output value 615 in this implementation may comprise a plurality of individual bit lines.

The counter 630 functions as a means of controlling the voltage gain of the voltage driver 410. The output value 615 is supplied to a variable gain amplifier 605, which has a variable gain that is controlled or established by the output value 615: higher values cause the amplifier 605 to have a higher gain, while lower values cause the amplifier 605 to have a lower gain. Thus, the gain of amplifier 605 increases when $V_{dis} < V_{cm}$ and decreases when $V_{dis} > V_{cm}$, in an analog calibration approach for example. An explanation for the values of F* in a digital calibration approach are described below.

In the illustrated implementation, the variable gain amplifier 605 comprises an op-amp 610 that is capable of sinking or sourcing current to provide positive or negative amplification of a nominal reference voltage $V_{nom}$. Op-amp 610 is biased by resistors $R_g$, $R_h$, and $R_{v1}$. A first input of op-amp 610 receives $V_{nom}$ through $R_g$. A second input of amplifier 610 is connected to ground through $R_h$. The gain of amplifier 605 may be controlled by a digitally controllable variable resistor $R_{v1}$, which is connected in series between the second input and the output of the op-amp 610. In the described embodiment, $R_g$ has half the resistance of $R_h$. $R_h$ is equal to a nominal or intermediate value within the range of resistances that can be produced by variable resistor $R_{v1}$. The resistive value of resistor $R_{v1}$ is controlled by value 615, which is received from counter 630. The bandwidth of op-amp 610 can be further limited by additional capacitance to reduce noise, thereby eliminating the need for a low-pass filter.

Both variable resistor $R_{v1}$ and variable gain amplifier 605 can be implemented in a variety of different ways. In certain implementation(s), variable resistor $R_{v1}$ can be implemented as a series of binary-weighted resistances, each of which is potentially shorted by a corresponding control transistor. The gates of the control transistors can be connected to the individual bit lines of the value 615, so that a logical true on any particular bit line causes a corresponding resistance to be included in the series, and a logical false causes the corresponding resistance to be omitted from the series.

Optionally, the up/down counter 630 has an enable/disable input 625 that enables and disables the counter 630. For example, the counter 630 may increment or decrement output value 615 when the enable/disable input is logically true, but hold output value 615 constant whenever the enable/disable input is logically false.

The enable/disable input 625 allows the gain of amplifier 605 to be set during an initialization period. For example, the enable/disable input 625 may be controlled so that the counter 630 is responsive to feedback signal F* only during the initialization period. During an operational period following the initialization period, the enable/disable input 625 may be set to the disable mode so that digital value 615 remains constant. Thus, the gain of amplifier 605 may be set during an initialization period and may remain constant during a subsequent operational period.

Utilizing an initialization period to establish a desired amplifier gain may be advantageous because the surrounding circuits can be disabled or otherwise configured to generate less noise and interference, thereby producing a more accurate, steady-state evaluation of the proper gain for the amplifier 605. Once the proper gain is determined, it can be held steady, which is desirable during actual operation of the integrated circuit. Optionally, the "initialization" can be repeated and/or updated at specified intervals to correct for voltage drifts and other effects.

FIG. 7 is a schematic view of another exemplary implementation of a reference voltage driver 410 such as may be used in the scheme of FIG. 4A et seq. FIG. 7 shows an alternative implementation that is similar to the implementation of FIG. 6. As depicted in FIG. 7, the voltage driver 410 includes a storage register 710 that is located between the up/down counter 630 and the variable gain amplifier 605. In this implementation, control circuit(s) (not shown in FIG. 7) may be used to latch the value 615 into the register 710, from the counter 630, after an initialization period. The register 710 provides this latched value, designated in FIG. 7 by reference numeral 705, to the variable gain amplifier 605 to control the gain of the amplifier 605.

In this implementation, various control signals, collectively designated by the label "Control" and the reference numeral 715 in FIG. 7, are available for use by control circuits within, e.g., an IC 400/500 to perform various operations with respect to the storage register 710. Such control signals 715 can include a latch signal that latches the value 615 into the register 710. In addition, the control signals 715 might include data and control signals allowing the value stored by the register 710 to be written and read. During a typical initialization or calibration period, the register 710 may be controlled so that its output 705 duplicates the output 615 of the counter 630. Once a steady state is reached, the register 710 may be controlled so that it maintains a constant output 705, regardless of further changes in the counter value 615.

An advantage of this configuration is that the output value 705 that results from initialization can be read by control circuitry to determine operating parameters of the IC. For example, the control circuitry can determine the adjusted gain of the variable amplifier 605 and can potentially use this gain value to infer other device parameters. Furthermore, the register 710 can optionally be written to by control circuits in order to force the gain of amplifier 605 to some predetermined level.

The read/write capabilities of the register 710 can potentially be used for a variety of functions. For example, by setting the value 705 to a wide range of values it is possible to determine the upper and lower limits of $V_{comp}$ that result in correct operation of the device. Specifically, $V_{comp}$ can be lowered (by reducing the value 705) while testing the circuit at each value, until a value is reached that causes a circuit failure. Subsequently, $V_{comp}$ can be raised (by increasing the value 705) until a value is reached that causes a circuit failure. The range of operational $V_{comp}$ values indicates the available voltage margin of the circuit. A related strategy is used in the digital calibration approach, as is described further below with reference to FIGS. 10A and 10B, to find a mid-point voltage value between the voltage failure levels. A corresponding mid-point register value 705 may then be written to the storage register 710 for use during operational phases. During the determination of the mid-point register value 705 during the calibration phase, the current register value 705 of the storage register 710 is read therefrom when the voltage failure levels are reached. As another example, during an operational period, register value(s) can be extracted from a parameters table 320 (e.g., of FIGS. 3A, 5, 11A, and 11B) and written to the storage register 710 to compensate for voltage deviations of incoming signals.

As yet another example of the read/write capabilities of the register 710, assume that a reference voltage is received from an external source and needs to be somehow translated for use by local circuits. To accomplish this translation using the circuit of FIG. 7, the external reference voltage is received by the variable gain amplifier 605 as $V_{nom}$. During a calibration procedure, a calibrated value 705 is determined that will result in a $V_{dis}=V_{cm}$. This calibrated value may be read from the register 710 and an offset value may be added. The resultant summed value may then be programmed back into the register 710 and used during normal operation of the device, to result in a $V_{dis}$ that is offset from $V_{cm}$ by a desired margin.

The desired offset value can be determined at design time and added to the calibrated value 705 after each calibration procedure. Alternatively, the desired offset value can be determined dynamically, as part of an initialization or calibration procedure. For example, the desired offset value may be calculated based on knowledge of greater noise contamination at the high or low voltage extreme of $V_{cm}$. Assuming that the interfering noise is located at the high voltage extreme of $V_{cm}$, then a negative offset value is added to the calibrated value 705 (to form a new calibrated value 705) that lowers $V_{dis}$ with respect to $V_{cm}$. Consequently, the lowered $V_{dis}$ maintains an equal usable voltage swing on the high and low sides despite the greater noise contamination on the high voltage extreme of $V_{cm}$.

Figure 8:
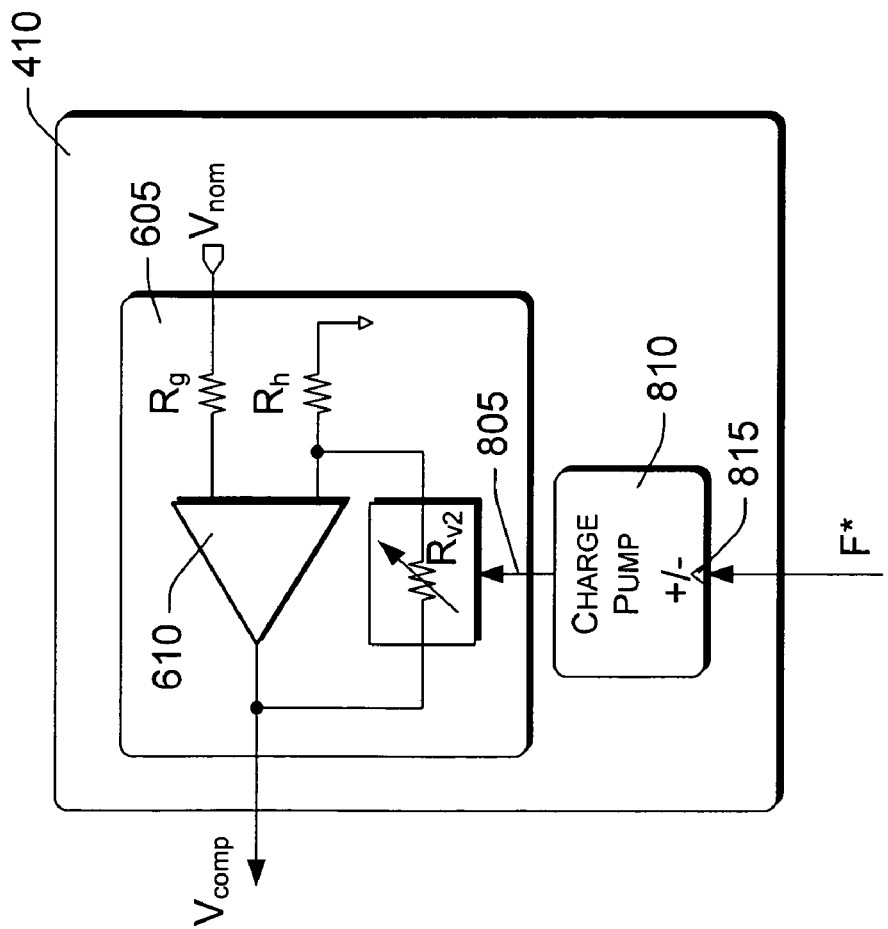
FIG. 8 is a schematic view of yet another exemplary implementation of a reference voltage driver such as may be used in the scheme of FIG. 4A et seq.

FIG. 8 is a schematic view of yet another exemplary implementation of a reference voltage driver 410 such as may be used in the scheme of FIG. 4A et seq. This implementation is similar to the previous implementations of FIGS. 6 and 7, except that the feedback signal F* is used to control a charge pump 810. The charge pump 810 is a capacitive device having a control input 815 that receives the feedback signal F*. However, other types of analog storage devices may be used in place of the charge pump 810, such as sample and hold devices. The charge pump 810 charges a capacitance when the feedback signal F* is logically true, and it discharges the capacitance when the feedback signal F* is logically false. However, an alternative logic can be used instead. The charge pump 810 has an analog control voltage output 805 that reflects the voltage of the capacitance.

In response to the feedback signal F*, the analog control voltage produced at the output 805 is set to increase when $V_{dis}<V_{cm}$ and decrease when $V_{dis}>V_{cm}$. The analog control voltage output 805 of the charge pump 810 is configured to control the gain of the reference voltage driver 410. In the implementation of FIG. 8, variable resistor $R_{v2}$ comprises an analog variable resistor whose resistance is controlled by the output 805 of the charge pump 810. As an example, the variable resistor $R_{v2}$ can comprise a weighted PMOS adjustable resistor. The variable resistor $R_{v2}$ may be configured to control the gain of the amplifier 605 in a manner similar to that of the variable resistor $R_{v1}$ of the implementation of FIG. 6.

Figure 9A:
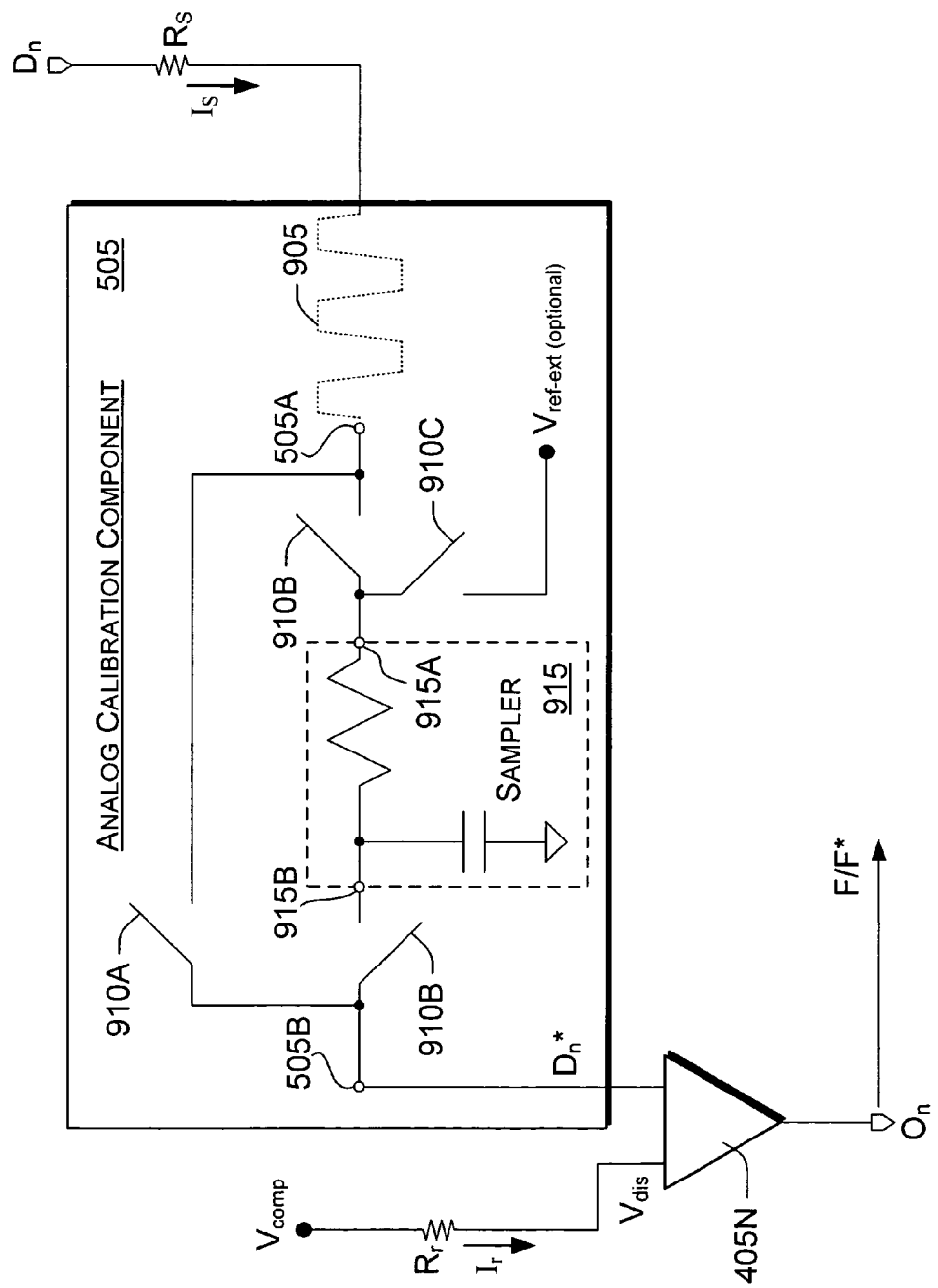
FIG. 9A is a schematic view of an exemplary analog calibration approach for providing a compensated voltage when receiving signals.

FIG. 9A is a schematic view of an exemplary implementation of the analog calibration component 505 (of FIG. 5). In this implementation, the analog calibration component 505 has an input 505A that accepts a received signal $D_n$, and an output 505B that provides the analog calibration component output $D_n^*$. The analog calibration component 505 includes a sampler 915 and a set of switches 910. The switches enable the received data signal 905 to be routed around the sampler 915 during operation and through the sampler 915 during initialization/calibration. The sampler 915 may comprise a low-pass filter, an integrator, and so forth. In FIG. 9A, the sampler 915 is illustrated as a low-pass filter with a resistor at the sampler input 915A and a capacitor at the sampler output 915B.

The switches 910A and 910B are used to either place the sampler 915 inline with the data signal 905 or to bypass the sampler 915. Specifically, the analog calibration component 505 has an input 505A that receives the data signal 905 at the analog calibration input 505A. When a first of the switches 910B is closed for an initialization phase, the sampler input 915A receives the data signal 905. The sampler output 915B is connected through the second of the switches 910B to the analog calibration output 505B. A switch 910A is connected to enable the sampler 915 to be bypassed by connecting the analog calibration input 505A directly to the analog calibration output 505B. Thus, when the two switches 910B are both closed and the switch 910A is open, sampler 915 samples the data signal 905 and provides the resulting sampled value as the analog calibration component output $D_n^*$ to the second input of the signal receiver 405N (e.g., in a calibration phase). When the two switches 910B are both open and the switch 910A is closed, on the other hand, the analog calibration component output $D_n^*$ is the same as the received signal $D_n$ (e.g., in an operational phase).

In the described implementation, the sampler 915 determines the common mode voltage of the data signal 905 by measuring the average voltage of a fifty percent (50%) duty cycle data signal. This common mode voltage $V_{cm}$ is output as the analog calibration component output $D_n^*$ at the analog calibration output 505B and provided to the second input of the signal receiver 405N. The signal receiver 405N compares the distributed voltage $V_{dis}$ to the common mode voltage $V_{cm}$ and produces the feedback signal F/F* as a result. The feedback signal F/F* is then used by the reference voltage driver 410 to adjust the compensated voltage $V_{comp}$, as is described above with reference to FIG. 4A et seq., especially FIGS. 5, 6, and 7.

The switches 910 are used to route data signals appropriately during respective operational and initialization phases. During an initialization phase when voltage compensation is being established using the feedback unit 420, the switch 910A is open and the switches 910B are both closed so as to utilize the sampler 915. During an operational phase when it is desired for received data signals to be routed directly (e.g., by bypassing the sampler 915) to the signal receiver 405N, at least one of the switches 910B is open and the switch 910A is closed. The latter switching arrangement may also be employed when there is both an analog calibration component 505 and a digital calibration component 510 and when it is desired to perform an initialization using only the digital calibration component 510. The switch 910C may optionally be implemented. If present, then it is used to pre-charge the sampler 915 so as to reduce a start-up or ramp-up time for the sampler 915 when an initialization phase is beginning. This pre-charging is accomplished by closing the switch 910C prior to initialization (e.g., during operational or other phases) to connect the sampler 915 to a, e.g., external reference voltage $V_{ref-ext}$. The switch 910C is open during actual initialization periods.

Figure 9B:
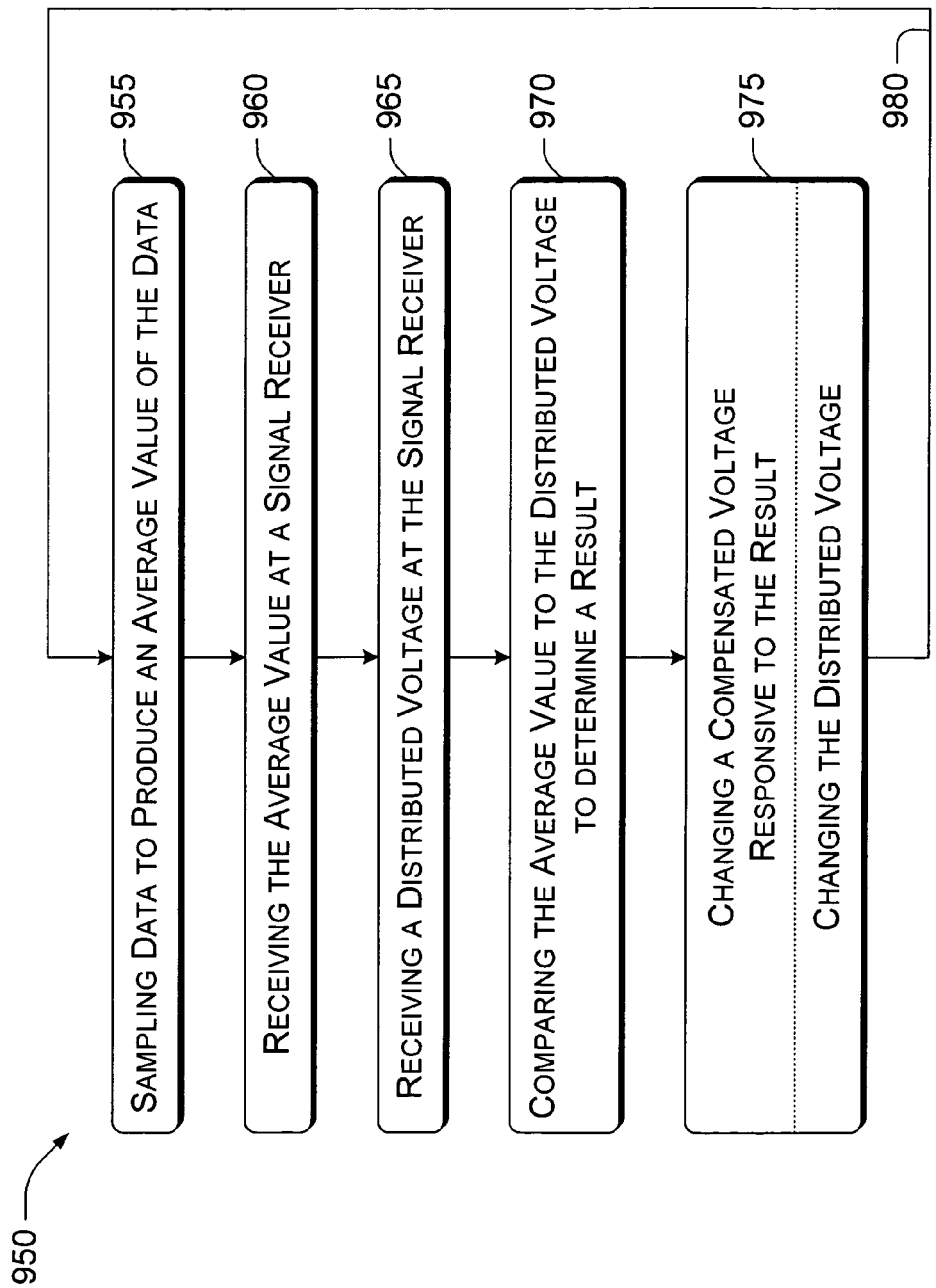
FIG. 9B is a flowchart illustrating an exemplary method for providing a compensated voltage using an analog calibration approach.

FIG. 9B is a flowchart illustrating an exemplary method for providing a compensated voltage using an analog calibration approach. The flowchart 950 includes actions 955–975. These actions 955–975 may be performed in an order other than that illustrated and/or fully or partially (substantially) simultaneously. Actions of the flowchart 950 may be performed by a receiving unit that is determining a compensation value to be used with a transmitting unit under consideration. Furthermore, the actions 955–975 are described below with reference to the hardware already described above, especially in FIG. 9A, but they can be performed by other hardware.

An action 955 comprises sampling data of a signal that is received at the receiving unit to produce an average value of the data. The sampler 915 may perform the sampling of the data of the data signal 905 and produce the average thereof at the sampler output 915B. To ensure that the average value of the data is the expected mid point of a voltage swing, the data can be from a fifty percent (50%) duty cycle signal. Examples of such a fifty percent (50%) duty cycle signal include 01010101, 00110011, 00010111, 10101010, 11001100, and 10101001, for an exemplary eight-bit data pattern. Other data patterns and other data pattern lengths may alternatively be employed. To be receiving a data signal having a fifty percent (50%) duty cycle, a receiving unit can load a transmitting unit with a selected data pattern and then instruct the transmitting unit to return the selected data pattern. In this manner, the receiving unit knows what the average voltage value is expected to be.

An action 960 comprises receiving the average value at a signal receiver, and an action 965 comprises receiving a distributed voltage at the signal receiver. The average value is represented by the analog calibration output $D_n^*$ (in the calibration mode) and can comprise the common mode voltage of the received signal $D_n$. The distributed voltage is represented by $V_{dis}$ and is illustrated being input to the signal receiver 405N. An action 970 comprises comparing the average value of the data to the distributed voltage at the signal receiver to determine a result. The signal receiver 405N can compare the distributed voltage $V_{dis}$ to the analog calibration output $D_n^*$ to determine whether the latter is greater or less than the former. The result output from the signal receiver 405N is represented by $O_n$, and this output comprises the feedback signal F/F* in the analog calibration approach.

An action 975 comprises changing a compensated voltage responsive to the result, with a consequence thereof being that there is a changing of the distributed voltage. In the described implementation, the reference voltage driver 410 (of FIG. 4A et seq.) receives the feedback signal F/F* and modifies the output voltage thereof (i.e., the compensated reference voltage $V_{comp}$). The distributed reference voltage $V_{dis}$ is a version of the compensated reference voltage $V_{comp}$, so it is consequently changed as well. An arrow 980 leads from the action 975 to the action 955 to indicate that all or some of the actions 955–975 are repeated during initialization periods until the feedback loop is stabilized. Thus, the actions are normally repeated until the distributed voltage $V_{dis}$ is approximately equal to the average value of the data as produced by the sampler 915 and as received at the signal receiver 405N.

Figure 10A:
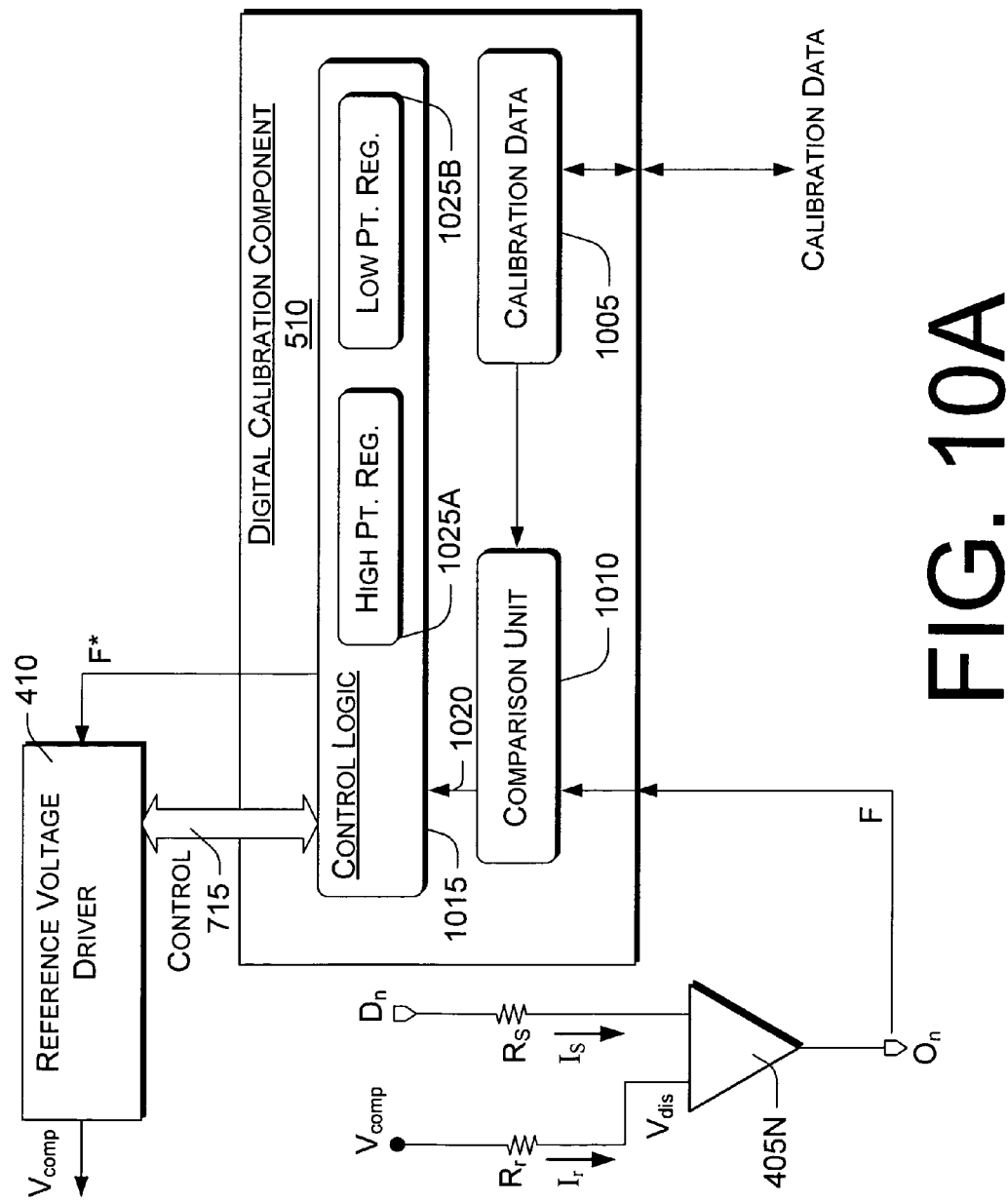
FIG. 10A is a block diagram view of an exemplary digital calibration approach for providing a compensated voltage when receiving signals.

FIG. 10A is a block diagram view of an exemplary implementation of the digital calibration component 510 (of FIG. 5). The digital calibration component 510 implicitly determines the common mode voltage of the received signal $D_n$ and sets the distributed voltage $V_{dis}$ approximately equal thereto at the signal receiver 405N using the reference voltage driver 410. The digital calibration component 510 causes the reference voltage driver 410 to increase the compensated reference voltage $V_{comp}$ that is output therefrom until an error is detected in interpreting the received signal $D_n$. The digital calibration component 510 also causes the reference voltage driver 410 to decrease the compensated reference voltage $V_{comp}$ until an error is detected in interpreting the received signal $D_n$. From these two extreme values of the compensated reference voltage $V_{comp}$, a mid-point value of the compensated reference voltage $V_{comp}$ is determined. This mid-point value of the compensated reference voltage $V_{comp}$ degrades to a distributed voltage $V_{dis}$ that is approximately equal to the common mode voltage of the received signal $D_n$.

The digital calibration component 510 controls the compensated reference voltage $V_{comp}$ of the reference voltage driver 410 using the feedback signal F* and the control bus 715. An exemplary implementation of the control bus 715 is at least partially described above with reference to FIG. 7. The digital calibration component 510 receives the feedback signal F and produces the feedback signal F*. The digital calibration component 510 also has interfaces for receiving and/or providing calibration data and for the control bus 715. Internally, the digital calibration component 510 includes calibration data 1005, a comparison unit 1010, and control logic 1015.

As is described above with reference to FIG. 5, the signal receiver 405N accepts as input the distributed reference voltage $V_{dis}$ and the received signal $D_n$, and it produces as output $O_n$ the feedback signal F. The feedback signal F is a digital value that reflects a digital pattern of the received signal $D_n$, as long as the difference between the common mode voltage of the received signal $D_n$ and the distributed voltage $V_{dis}$ is not too great.

The feedback signal F is supplied to the comparison unit 1010 of the digital calibration component 510. The comparison unit 1010 also accepts the calibration data from the calibration data register 1005. In the described digital calibration embodiment, the calibration data comprises an expected value to be received from a transmitting unit because the transmitting unit was sent the calibration data and asked to return it to the receiving unit as the received signal $D_n$. With the receipt of the feedback signal F and the calibration data from the calibration data register 1005, the comparison unit 1010 can compare the two inputs and determine if they are equal. The comparison unit 1010 provides a comparison output 1020 to the control logic 1015 in response to this determination.

The control logic 1015 uses the comparison output 1020 to digitally control the reference voltage driver 410 until the common mode voltage of the received signal $D_n$ is implicitly determined. The control logic 1015 is configured to cause the reference voltage driver 410 to ramp the compensated reference voltage $V_{comp}$ toward either an extreme low voltage or an extreme high voltage until the extreme low voltage and the extreme high voltage are both determined.

The control logic 1015 includes a high point register 1025A and a low point register 1025B to note the extreme high voltage value and the extreme low voltage value using a register value that corresponds to the storage register 710 (of FIG. 7). In order to determine the extreme high voltage value, the control logic 1015 uses the feedback signal F* to cause the reference voltage driver 410 to increase the compensated reference voltage $V_{comp}$ until a receiving failure is detected by the comparison unit 1010 and signaled to the control logic 1015 via the comparison output 1020. A failure eventually results because as the compensated reference voltage $V_{comp}$ increases, the distributed voltage $V_{dis}$ increases until it is so far above the common mode voltage of the received signal $D_n$ that the data values of the received signal $D_n$ cannot be correctly interpreted at the signal receiver 405N. In effect, the voltage swing (and related timing margin) becomes sufficiently small for proper signal reception and data value interpretation. (The graphs 350 of FIG. 3A provide further clarification.)

After the control logic 1015 has caused the reference voltage driver 410 to increase the compensated reference voltage $V_{comp}$ until a failure is detected by the comparison unit 1010 and signaled on the comparison output 1020, the control logic 1015 notes the high extreme voltage value. The control logic 1015 communicates with the reference voltage driver 410 over the control bus 715 to extract the register value stored within the storage register 710. This register value is then stored at the high point register 1025A to reflect the high extreme voltage value. The control logic 1015 also uses the feedback signal F* to cause the reference voltage driver 410 to decrease the compensated reference voltage $V_{comp}$ until a receiving failure is detected by the comparison unit 1010 and signaled to the control logic 1015 via the comparison output 1020. When the voltage failure point is determined on the low side, the control logic 1015 again extracts the register value stored within the storage register 710 via the control bus 715, and it stores this register value at the low point register 1025B to reflect the low extreme voltage value.

After high and low point register values have been stored in the high point 19 register 1025A and the low point register 1025B, respectively, the control logic 1015 determines a mid point value therebetween that corresponds to a mid point voltage value. The mid point (register) value is then applied to the storage register 710 via the control bus 715 by the control logic 1015. When the reference voltage driver 410 sets/modifies the compensated reference voltage $V_{comp}$ according to the mid point register value stored in the storage register 710 as the current (voltage) compensation value, the distributed voltage $V_{dis}$ becomes approximately equal to the common mode voltage of the received signal $D_n$. Setting the distributed voltage $V_{dis}$ approximately equal to the common mode voltage of the received signal $D_n$ provides for an improved voltage swing for properly detecting digital values of the received signal $D_n$.

There are many alternatives regarding the content and use of the calibration data. For example, although the calibration data is illustrated as being received at and sent from the digital calibration component 510 (via the calibration data register 1005), the transfer of the calibration data may be unidirectional in certain implementation(s). More specifically, if the digital calibration component 510 is determining the content of the calibration data, then the calibration data may be sent from the digital calibration component 510 for transmission to a transmitting unit (e.g., a memory storage module 315) and subsequent reception therefrom. On the other hand, if a different component is determining the calibration data instead of the digital calibration component 510, then the calibration data may be received at the digital calibration component 510 and stored at the calibration data register 1005 until needed by the comparison unit 1010. The calibration data is provided to the comparison unit 1010 to determine whether or not the expected data value is received with the received signal $D_n$ regardless of what component selects the content of the calibration data.

The content of the calibration data may be a pre-selected data bit pattern of a predetermined bit length, such as eight (8) bits, but other bit lengths may be used instead. The bit pattern may include both "1s" and "0s". Alternatively, the bit pattern may be a string of all "1s" or all "0s" to simplify the comparison unit 1010 because only a single comparator is needed in such an implementation as opposed to multiple comparators or a single comparator with relatively significant control logic and/or memory buffers to keep track of the comparisons and/or detected bits across an entire bit pattern. On the other hand, a bit pattern with both "1s" and "0s" may enable a more accurate result. In fact, a first bit pattern may be the most problematic bit pattern on the high voltage side while a second, different bit pattern may be the most problematic bit pattern on the low voltage side. In such a case, both bit patterns may be used for a more accurate result at their respective most problematic sides. Furthermore, if the two different bit patterns are not known a priori, then all possible bit patterns of a given length of interest (or a subset thereof) may be tried for both the high and low voltage sides of the voltage swing so that the most problematic bit pattern(s) are eventually used. The data bit pattern of the calibration data that is compared at the comparison unit 1010 may therefore be of different and even changing values and lengths.

Regardless of the length or content of the data pattern of the calibration data, the comparison unit 1010 provides a result signal or comparison output 1020 to the control logic 1015. The comparison output 1020 serves to inform the control logic 1015 when there is an error, i.e., when the feedback signal F does not match the calibration data of the calibration data register 1005. The comparison output 1020 may only be active when there is an error. Alternatively, the comparison output 1020 may be logically true (e.g., indicating a favorable report on a comparison) until it switches to logically false (e.g., indicating an unfavorable report on a comparison). Again, positive logic, negative logic, or some combination thereof may be selected and implemented for the described components. Although not explicitly shown in FIG. 10A, the control logic 1015 may also be able to control the timing or other aspects of the comparison unit 1010. In effect, the comparison unit 1010 informs the control logic 1015 when there has been a failure with the receiving and/or interpretation of a received signal $D_n$.

Instead of being separate, the control logic 1015 may be related to, part of, or located in/with any control logic of the reference voltage driver 410, or vice versa. However, to the extent they are separate, the control bus 715 may be used for the communication of data and/or instructions between them. The instructions may include the loading and unloading of data register values, including data register values 705 for the storage register 710 (of FIG. 7), as is described above. The data communicated across the control bus 715 may include (voltage) compensation values that are entered into the storage register 710 to set the gain of the reference voltage driver 410. The compensation values communicated across the control bus 715 to the storage register 710 may include data register values 705 selected by the control logic 1015 for calibration analysis. In other words, the feedback signal F* may be omitted, and the control logic 1015 may directly set the data register values 705 of the storage register 710 during a calibration instead of causing the incrementing or decrementing thereof using the feedback signal F*. In this case, the communication across the control bus 715 serves as a feedback signal controlling the reference voltage driver 410. The compensation values communicated across the control bus 715 to the control logic 1015 may include the values to be stored in the registers 1025, including the high point register 1025A and the low point register 1025B. Although it is not specifically shown, the determined digital value representing the mid point between the high and low voltage failure points may also be stored in a register at the control logic 1015.

Figure 10B:
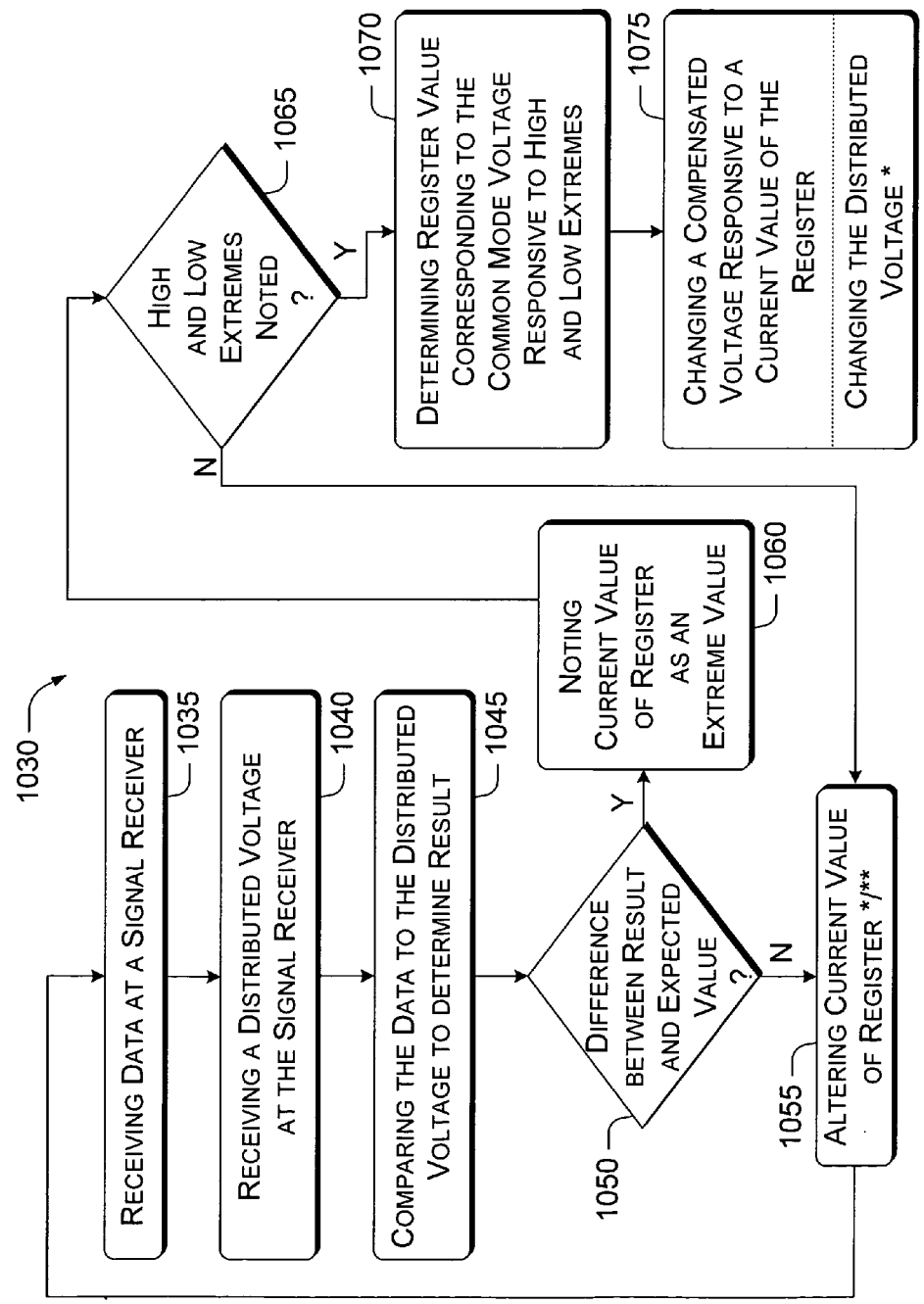
FIG. 10B is a flowchart illustrating an exemplary method for providing a compensated voltage using a digital calibration approach.

FIG. 10B is a flowchart illustrating an exemplary method for providing a compensated voltage using a digital calibration approach. The flowchart 1030 includes actions 1035–1075. These actions 1035–1075 may be performed in an order other than that illustrated and/or fully or partially (substantially) simultaneously. Actions of the flowchart 1030 may be performed by a receiving unit that is determining a compensation value to be used with a transmitting unit under consideration. Furthermore, the actions 1035–1075 are described below with reference to the hardware already described above, especially that of FIG. 10A, but they can be performed by other hardware.

An action 1035 comprises receiving data at a signal receiver. For example, the data may be a data pattern that is carried by a received signal $D_n$, and the signal receiver may be the signal receiver 405N. An action 1040 comprises receiving a distributed voltage at the signal receiver. The distributed voltage may be the distributed voltage $V_{dis}$. An action 1045 comprises comparing the data to the distributed voltage at the signal receiver to determine a result. During an initialization period, for instance, the signal receiver 405N produces an output $O_n$ that is routed to the digital calibration component 510 as the feedback signal F (e.g., a result).

The result from the action 1045 is then compared to an expected value thereof. In the implementation of FIG. 10A, the expected value may be the calibration data that is stored in the calibration data register 1005 and that was previously sent (or otherwise provided) to the transmitting unit under consideration. An action 1050 comprises determining whether there is a difference between the result and the expected value. The comparison unit 1010 can compare the expected value to the feedback signal F to determine whether or not they differ from one another. If not, then an action 1055 comprises altering a current value of a register that controls a voltage. Thus, the control logic 1015 may be configured to respond to the comparison output 1020 by changing (e.g., increasing or decreasing by one or more units) the digital register value that is located in the storage register 710 of the reference voltage driver 410 via the control bus 715.

The single asterisk (*) present in the block of the action 1055 indicates that the voltage (e.g., a compensated voltage) is changed by altering the current value of the register. Also, the distributed voltage (i.e., a derivative of and a version of the compensated voltage) is consequentially changed as well. The block 1075, which also includes a single asterisk (*), may therefore be performed as a result of the action 1055. Additionally, the double asterisk () of the block 1055 indicates that control logic or similar may be keeping track of which direction (either higher or lower) the current value of the register is to be altered. The altering of the digital register value of the storage register 710** changes/sets the compensated reference voltage $V_{comp}$, and therefore the distributed reference voltage $V_{dis}$.

If, on the other hand, there is a difference between the result and the expected value (from the action 1050), then an action 1060 comprises noting (e.g., recording) the current value of the register as an extreme value. The extreme value may be either an extreme high value or an extreme low value. Hence, the control logic 1015, which can be aware of and/or controlling the direction in which the voltage values are changing, is capable of storing the current digital register value of the storage register 710 (via the control bus 715) into the high point register 1025A or the low point register 1025B, respectively. After noting the current register value as an extreme value, an action 1065 comprises determining whether or not both the high extreme value and the low extreme value have been noted. If not, then the action 1055 comprises altering the current value of the register. The double asterisk () of the block 1055** in this context indicates that control logic or similar may start moving the register value in the opposite direction, or alternatively, the register value may first be set to a default or other starting point value prior to the repetitive altering thereof in the opposite direction.

If, on the other hand, both the extreme high value and the extreme low value have been noted (as determined from the action 1065), then an action 1070 comprises determining a register value that corresponds to the common mode voltage responsive to the noted high and low extreme values. The common mode voltage may be established at the voltage reference input of the signal receiver 405N by finding the median value between the high extreme and the low extreme values as stored in the high and low point registers 1025A and 1025B, respectively. Alternatively, a different (compensation) value may be determined by the digital calibration component 510. For example, an offset may be applied to the median value to achieve the different compensation value. Such an offset may be useful if, for example, it is known that there is greater noise near the high point of the voltage swing. In this situation, the offset may be used to lower the compensation value below the median value to account for this greater noise on the high voltage side.

After the action 1070, the register value is set to the median value or another compensation value determined responsive to the high and low extreme values. The control logic 1015 may load the storage register 710 of the reference voltage driver 410 with the median or other voltage compensation value. An action 1075 comprises changing a compensated voltage responsive to the current register value setting, with a consequence thereof being that there is a changing of the distributed voltage. The distributed voltage $V_{dis}$ at the signal receiver 405N is therefore at least approximately equal to the common mode voltage of the data signal $D_n$ at the signal receiver 405N.

The single asterisk (*) in the block 1075 correlates with the single asterisk in the block 1055 and indicates that the action 1075 is also performed, with likely a different current value of the register, after the action 1055. It should be noted, however, that the action 1055 usually alters the current value of the register by incrementing or decrementing, instead of setting the current value as is performed as a result of the action 1070 and for the action 1075. Nevertheless, the control logic 1015 may also set the current value of the register in an action 1055, especially when switching between searching for one extreme value to searching for the other extreme value, where it may be beneficial to start both searches at some default value near a projected center.

Figure 11A:
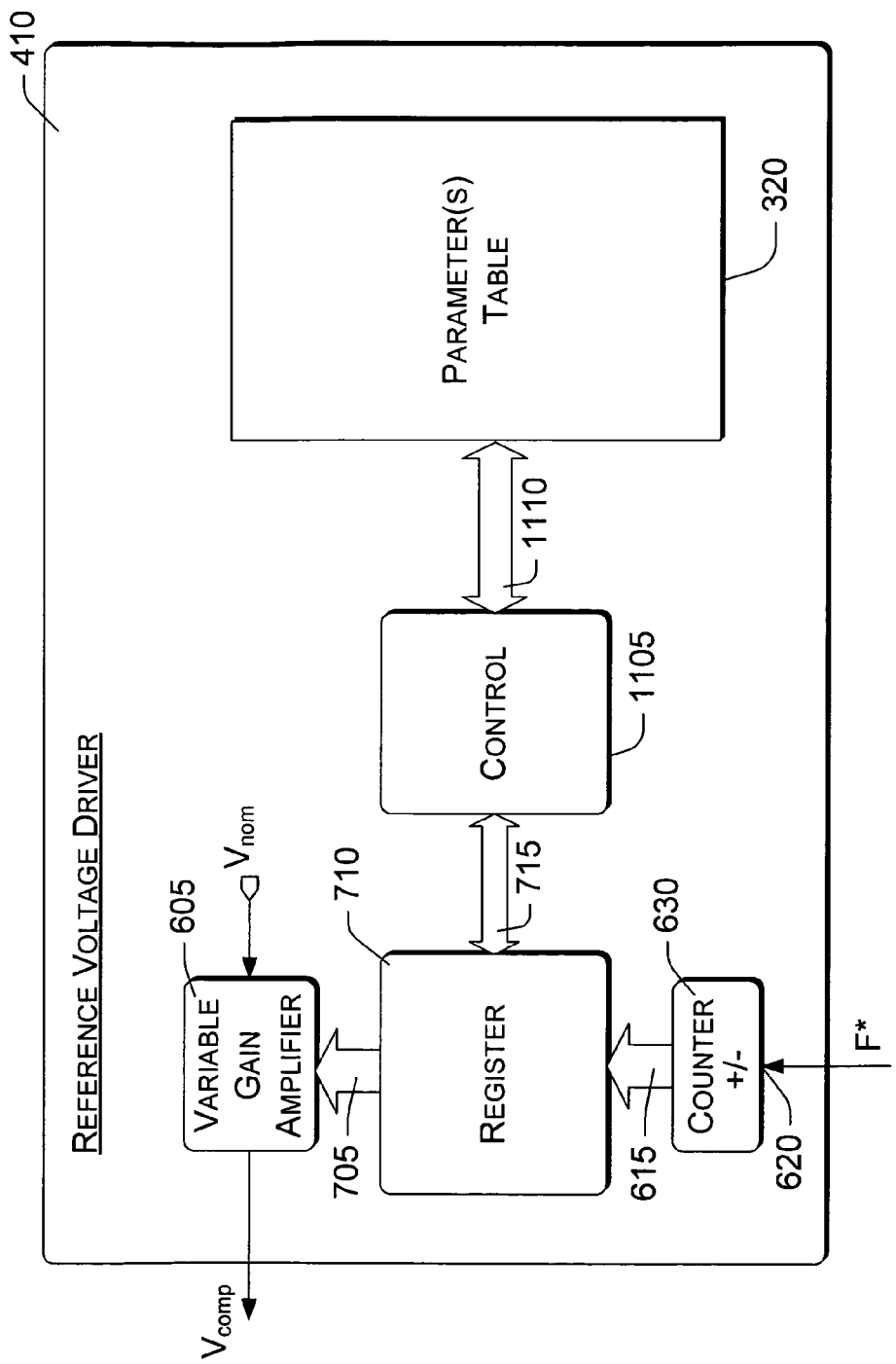
FIG. 11A is a block diagram view of an exemplary parameters table approach for accommodating signaling.

FIG. 11A is a block diagram view of an exemplary parameters table approach for accommodating signaling. The reference voltage driver 410 of FIG. 11A may operate similarly to the reference voltage driver 410 of FIG. 7, which is described above. However, in the implementation of FIG. 1A, the reference voltage driver 410 includes a parameters table 320. As such, the reference voltage driver 410 may be especially beneficial in any component that is to receive data signals from more than one transmitting unit (such as a memory controller module 310 (of FIG. 3A) or another master-type component). In addition to the parameters table 320, a control block 1105 and a parameters table bus 1110 have also been added to the reference voltage driver 410 of FIG. 11A for interacting with the parameters table 320.

As is described above with reference to FIG. 3A, the parameters table 320 includes multiple entries, with each entry including an ID and associated attribute(s) for each transmitting unit from which data signals are to be received. In the implementation of FIG. 1A, the associated attributes include at least a (voltage) compensation value for use in the storage register 710. Utilizing the compensation value associated with the ID of a particular transmitting unit, when receiving signals from that particular transmitting unit, facilitates correct interpretation of received data.

When a signal is to be received or is being received from a particular transmitting unit having a particular ID, the entry in the parameters table 320 that includes that particular ID is accessed and the compensation value is extracted therefrom. In the implementation of FIG. 1A, the control block 1105 is it configured to extract, e.g., a compensation value from the parameters table 320 using the parameters table bus 1110 and to load it into the register 710 using the control bus 715. The reference voltage driver 410 may then establish the compensated voltage $V_{comp}$ according to the compensation value stored therein by the control block 1105.

When a compensation value has been determined, using an analog or a digital calibration approach, for a particular transmitting unit having a particular ID, the control block 1105 is configured to acquire the determined compensation value and to store it over the parameters table bus 1110 into an entry of the parameters table 320 that is associated with that particular ID. The control block 1105 acquires the determined compensation value over the control bus 715 from the storage register 710 or from another source, such as directly from the digital calibration component 510 (of FIG. 10A). The control block 1105 may optionally be in communication with or combined with the control logic 1015 (of FIG. 10A), or vice versa, in digital calibration approaches. It should be noted that although the parameters table bus 1110 is illustrated as being bidirectional, it may instead be unidirectional, especially if there is a second bus in communication with the parameters table 320 that is operating in a different direction.

FIG. 11B illustrates an exemplary parameters table 320. The parameters table 320 may be formed from any general data structure and stored in a memory of a receiving unit. In the implementation of FIG. 11B, the parameters table 320 includes a heading row 1115 and multiple entries 1120, specifically 1120(1), 1120(2), through 1120(n). Each entry of the multiple entries 1120 includes an "ID#" and associated attribute(s). With respect to the "ID#", as is described above with reference to FIGS. 3A and 5, each transmitting unit or potential transmitting unit is associated with an ID to enable or otherwise facilitate the receiving of signals therefrom (or the transmitting of signals thereto). With respect to the associated attributes, they include specifications (from design, operational testing, etc.) for each particular transmitting unit such as voltage swing, reference voltage level, timing margin, and so forth. It should be noted that although a heading row 1115 is illustrated for clarity in the parameters table 320 of FIG. 11B, one need not be present in actual data structure implementation(s).

In the parameters table 320 of FIG. 1B, the associated attributes are represented by a "$V_{comp}$ REGISTER VALUE" item and an "ATTRIBUTES TYPE" item. The "$V_{comp}$ REGISTER VALUE" item may be considered an example of an "ATTRIBUTES TYPE", but it is separated identified and labeled so as to enable a more-explicit description thereof with reference to FIG. 11A. For example, compensation values stored under the "$V_{comp}$ REGISTER VALUE" item of the heading row 1115 comprise digital values that are usable in the storage register 710 for setting the gain of the variable gain amplifier 605. Thus, when a receiving unit that is incorporating a reference voltage driver 410 of FIG. 11A is to be receiving signals from a transmitting unit associated with the ID#2, for example, the control block 1105 extracts the "$V_{COMP}$ REGISTER VALUE #2" from the parameters table 320 entry that is associated with the "ID#2" via the parameters table bus 1110. The control block 1105 also inserts the "$V_{COMP}$ REGISTER VALUE #2" into the storage register 710 via the control bus 715. The compensated voltage $V_{comp}$ output from the reference voltage driver 410, and thus the distributed voltage $V_{dis}$ (which is a degraded version thereof), is appropriately compensated with respect to the transmitting unit having the "ID#2", which is the transmitting unit from which signaling is to be received.

It As indicated by the "ATTRIBUTES TYPE" item in the heading row 1115 of the parameters table 320, there may be other attributes associated with each "ID#" besides or instead of a "$V_{COMP}$ REGISTER VALUE". These other attributes may include other values as determined in actual operation, as specified during design, and so forth. For example, the associated attributes for two identification numbers (ID#s) may indicate that a first one has a voltage swing of 400 mV and a second one has a voltage swing of 800 mV. These attributes may likewise be extracted from the parameters table 320 (e.g., by the control block 1105 via the parameters table bus 1110) and loaded into registers or other control components/settings so that the receiving unit may communicate with a targeted transmitting unit using appropriate parameters. Although the parameters table 320 is illustrated as being within the reference voltage driver 410, it may alternatively be partially or entirely located somewhere else within the receiving unit, especially when the parameters table 320 stores associated attributes for use by components other than the reference voltage driver 410.

The associated attributes are indicated in the parameters table 320 of FIG. 11B according to type (e.g., Types A, K, C, M, ... x). In such an implementation, all or many of the relevant attributes that are identical for multiple transmitting units may be "extracted" by referring to a listing of the parameters for a specific type. Such a listing may be stored elsewhere in the parameters table 320 (not explicitly shown) or elsewhere in the receiving unit. In this implementation, the actual elements in the entries 1120 for the different "TYPE x ATTRIBUTES" (under the "ATTRIBUTES TYPE" item in the heading row 1115) comprise different pointers to different collections of attributes for particular transmitting unit types. This approach may be beneficial from a memory usage perspective when there are, for example, four transmitting units of Type A and six transmitting units of Type K, and each type has many different relevant parameters to be used when interfacing with a transmitting unit of one of those types. Alternatively, instead of this pointer approach, each entry 1120 in the parameters table 320 may simply list all of the relevant parameters for each attribute associated with a given ID#.

Figure 11C:
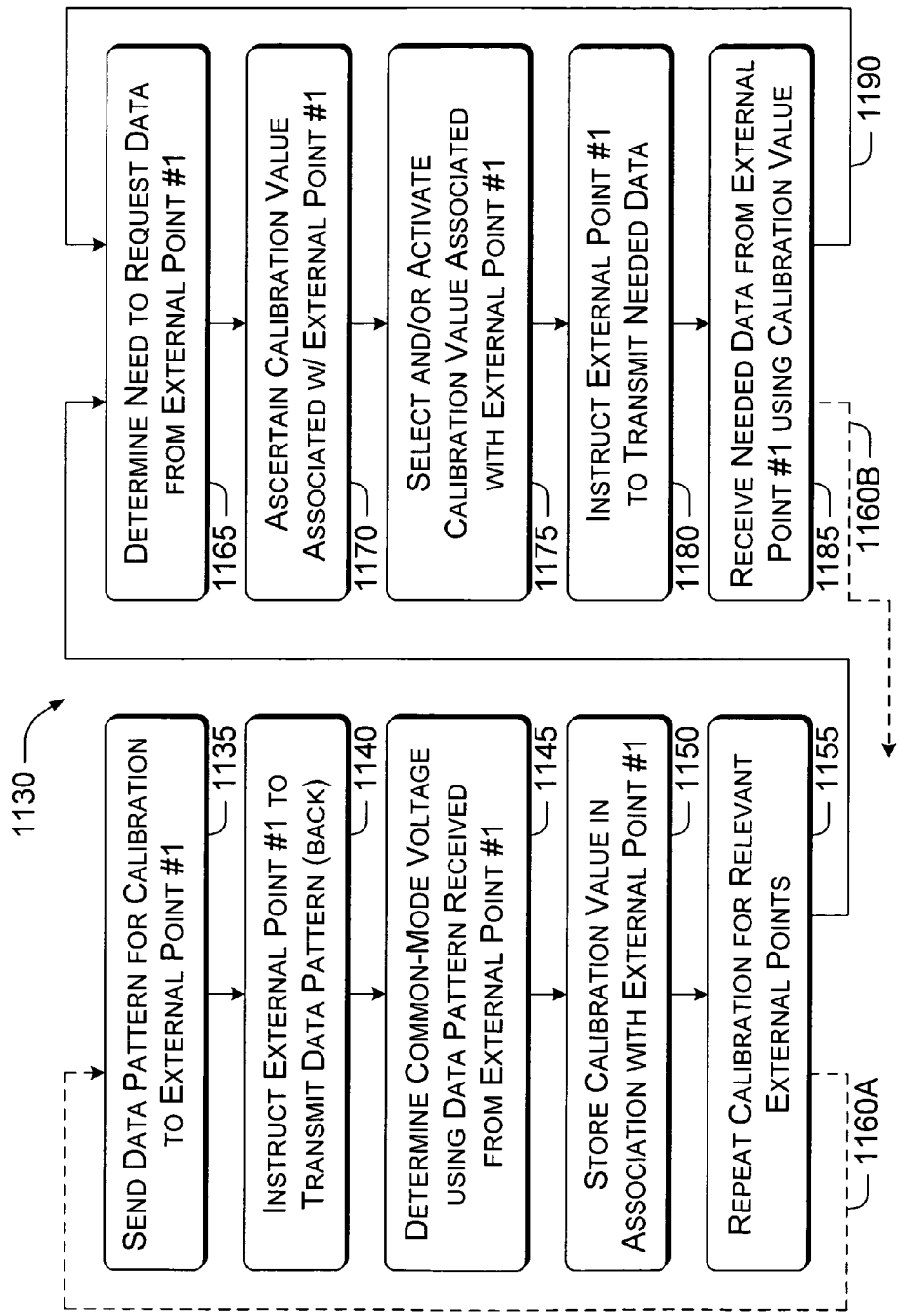
FIG. 11C is a flowchart illustrating an exemplary method for accommodating signaling using a parameters table approach.

FIG. 11C is a flowchart illustrating an exemplary method for accommodating signaling using a parameters table approach. The flowchart 1130, which includes actions 1135–1185, may thus be performed by a receiving unit having a parameters table 320, especially one having at least one (analog or digital) calibration component. These actions 1135–1185 may be performed in an order other than that illustrated and/or fully or partially (substantially) simultaneously. In the flowchart 1130, the actions 1135–1185 are roughly divided into two phases: initialization and operation.

The actions 1135–1155 correspond to an initialization phase, and the actions 1165–1185 correspond to an operational phase. The actions 1135–1185 of both phases are described below with reference to the hardware already described above, especially that of FIGS. 3A, 11A, and 11B, but they can be performed by other hardware. Additionally, the hardware described above with reference to FIGS. 4A, 5, 9A, and 10A may be used to perform at least part of some of the actions 1135–1185. During an initialization phase, for example, an analog calibration component 505 or a digital calibration component 510, along with a signal receiver 405N, may be used to determine a (voltage) compensation value. During an operational phase, a reference voltage driver 410, along with a parameters table 320, may be employed to utilize the determined compensation value while receiving signaling from a transmitting unit.

During an initialization phase, an action 1135 comprises sending a data pattern (from the receiving unit) for calibration purposes to an external point #1. The data pattern, examples of which are provided above with reference to FIGS. 9A and 10A, may be sent from a memory controller module 310 to a memory storage module 315A (of FIG. 3A) in the form of a write data command. An action 1140 comprises instructing the external point #1 to transmit the data pattern back (to the receiving unit). Hence, the memory controller module 310 may instruct the memory storage module 315A to return the data pattern using a read data command. The memory storage module 315A then provides the data pattern to the memory controller module 310.

An action 1145 comprises determining a common mode voltage of data signal(s) received from the external point #1 using the data pattern received therefrom. The common mode voltage of data signal(s) received from the external point #1 may be analyzed using an analog calibration approach (e.g., of FIGS. 9A and 9B) or using a digital calibration approach (e.g., of FIGS. 10A and 10B). In an analog calibration approach, the common mode voltage of the data signals is determined "explicitly" using a sampler. For example, the common mode voltage of the received signal $D_n$ may be determined by the sampler 915 of the analog calibration component 505. In a digital calibration approach, on the other hand, the common mode voltage may be determined more "implicitly" using a comparison unit, control logic, etc. to determine a median value that adjusts a supplied voltage to the common mode voltage at a signal receiver. For example, the common mode voltage of the received signal $D_n$ may be determined "implicitly" by setting the distributed voltage $V_{dis}$ equal thereto at the signal receiver 405N using the elements of the digital calibration component 510 to interpolate the middle of a voltage swing of the received signal $D_n$.

Using a result from, and/or the process of, determining the common mode voltage, an action 1150 comprises storing a calibration value in association with the external point #1 in a data structure of the receiving unit. For example, a calibration value may be stored in the parameters table 320 of the memory controller module 310 at an entry 1120 that is associated with the ID 325 of the memory storage module 315A. One example of an attribute that is storable in the parameters table 320 is a calibration value, which is a value determined once a system is interconnected. One example of a calibration value is a compensation value, which is a value that compensates for changes or other deviations of parameter levels. And one example of a compensation value is a voltage compensation value, which is the value in the storage register 710 after an analog or a digital calibration has been completed. Hence, the action 1150 may entail the control block 1105 retrieving the determined voltage compensation value from the storage register 710 via the control bus 715 and providing it to the parameters table 320 via the parameters table bus 1110. Alternatively, for a digital calibration approach, the action 1150 may entail the control logic 1015 (of FIG. 10A) transferring the voltage compensation value to the parameters table 320 without it being first stored in the storage register 710; the control block 1105 and/or the parameters table bus 1110 may optionally be involved in this transfer.

A receiving unit that is implementing the flowchart 1130 has the ability to receive signaling from multiple transmitting units. For example, the memory controller module 310 may receive signaling from both the memory storage module 315A and the memory storage module 315B. Thus, an action 1155 comprises repeating the calibration for relevant multiple external points. In the memory system 225 implementation of FIG. 3A, for example, the memory controller module 310 may repeat the calibration for each memory storage module 315 that it controls. This repetition for all actual or potential transmitting units (e.g., for external points #1 through #n) is indicated by the dashed arrow 1160A. Once a calibration value has been stored for all relevant transmitting units, the initialization phase is completed, and an operational phase begins. The operational phase becomes active when it is time to receive signaling from one or more transmitting units.

After entering the operational phase where signaling needs to be received from one or more of multiple transmitting units, an action 1165 comprises determining a need to request data from the external point #1. For example, the memory controller module 310 may receive a request from the processor 210 for a segment of memory. The memory controller module 310 determines which (one or ones) of the memory storage modules 315 need to be accessed to retrieve the requested memory segment. An action 1170 comprises ascertaining a calibration value that is associated with the external point #1. The memory controller module 310 ascertains the ID 325 of the memory storage module 315 that stores the requested memory segment, and the memory controller module 310 accesses the entry 1120 in the parameters table 320 that is associated with that ID 325 in order to ascertain the voltage compensation value (e.g., the "$V_{COMP}$ REGISTER VALUE") stored therewith.

An action 1175 comprises selecting/extracting and/or activating the calibration value that is associated with the external point #1. The associated calibration value (e.g., a voltage compensation value) may be extracted from the parameters table 320 of the memory controller module 310 and loaded into the storage register 710 by the control block 1105 using the buses 715 and 1110, for example. Alternatively, the associated calibration value may be selected via a pointer mechanism (e.g., a "TYPE C ATTRIBUTES" pointer) from a register of calibration values (e.g., a listing of attributes from the "TYPE A ATTRIBUTES" to the "TYPE X ATTRIBUTES"). An action 1180 comprises instructing the external point #1 to transmit the needed data, and an action 1185 comprises receiving the needed data from the external point #1 using the calibration value. Hence, the memory controller module 310 may instruct the memory storage module 315 to transmit the requested memory segment over the bus 305, and the memory controller module 310 may receive the memory segment while a voltage reference driver 410 is setting a compensated voltage $V_{comp}$ responsive to the voltage compensation value located in the storage register 710.

The calibration value (such as a voltage-level-adjusting voltage compensation value) of the action 1185 may be used to set, adjust, etc. a voltage level, a voltage swing, a timing frequency, a timing margin, and so forth. It should be understood that the calibration value of the operational phase of the flowchart 1130 (actions 1165–1185) is exemplary only and may instead be any general associated attribute of the transmitting units. The actions 1165–1185 may be repeated for any of the transmitting units from which data is requested (or otherwise received) during the operational phase, as indicated by the arrow 1190.

It should be noted that the initialization phase (actions 1135–1155) may be entered (and partially or fully completed) at times other than at start-up. As indicated by the dashed arrow 1160B, the operational phase may be interrupted for re-calibration. For example, after a predetermined period of time or after a predetermined number of detected (e.g., bit or byte) errors, the receiving unit can re-enter the initialization phase to re-calibrate the calibration values for one or more of the transmitting units. This re-calibration may account for changes due to temperature, random drift, usage events, and so forth.

If delays due to initialization need to be avoided (e.g, in a memory system implementation), re-entering initialization may be preventable or user configurable. Alternatively, the re-initialization may be performed gradually, with each interruption of the operational phase only permitting the re-calibration of a single transmitting unit. Partial re-calibration of a single transmitting unit may also be utilized for implementations where data accuracy and avoiding delays are both highly critical. Such a partial re-calibration may be effectuated by storing one or more digital values (e.g., for the storage register 710, for an extreme point, etc.) that is reached during the re-calibration process and prior to complete re-calibration, and then restarting the re-calibration at that or those digital values when the operational phase can next be interrupted. As yet another alternative for highly data and time critical implementations, calibration may occur constantly using a dedicated signal receiver and a dedicated connection between that transmitting unit and the signal receiver of the receiving unit as is described above.

Although implementations are primarily described herein as being used to adjust a distributed reference voltage $V_{dis}$ to be approximately equal to a common mode voltage $V_{cm}$ of a data signal, the described schemes and techniques can also be used to provide a distributed reference voltage $V_{dis}$ having some non-equal relationship with the common mode voltage $V_{cm}$. As one example that is described above with reference to the implementation of FIG. 7: in the storage register 710, the value 705 can be changed in a predefined or otherwise determinable manner after initialization/calibration to offset or translate $V_{dis}$ relative to $V_{cm}$ (e.g., because signal interference is particularly problematic at one voltage extreme or the other). Therefore, the distributed reference voltage $V_{dis}$ can be lowered below the common mode voltage $V_{cm}$ if noise or another deleterious effect is more problematic near the high voltage extreme, or vice versa.

The various implementations described above provide an effective way of establishing a voltage and of compensating or adjusting such a voltage for data signal degradations that occur due to factors such as interconnect resistances, device leakage currents, noise interference, high frequency timing, deleterious channel effects, and so forth. Although the implementations described herein operate with respect to a reference voltage, the same or similar schemes and techniques can be used with respect to other types of DC voltages. For example, the described schemes and techniques can be used to compensate or adjust supply voltages, ground voltages, bias voltages, and so forth.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A method for calibrating reception by a receiving unit, the method, comprising:
   sending a first data pattern from the receiving unit to a first external point;
   instructing the first external point to transmit the first data pattern back to the receiving unit;
   determining a first common mode voltage of a first data signal carrying the first data pattern back to the receiving unit;
   determining a first calibration value based on the action of determining a first common mode voltage of a first data signal; and
   storing the first calibration value in association with a first identification of the first external point.

2. The method as recited in claim 1, further comprising:
   sending a second data pattern to a second external point;
   instructing the second external point to transmit the second data pattern back;
   determining a second common mode voltage of a second data signal carrying the second data pattern back;
   determining a second calibration value based on the action of determining a second common mode voltage of a second data signal; and
   storing the second calibration value in association with a second identification of the second external point.

3. The method as recited in claim 2, wherein the first data pattern is identical to the second data pattern.

4. The method as recited in claim 2, wherein the first data pattern is different from the second data pattern.

5. The method as recited in claim 2, further comprising:
   determining a need to request data from the second external point;
   ascertaining that the second calibration value is associated with the second external point;
   activating the second calibration value;
   instructing the second external point to transmit the data; and
   receiving the needed data from the second external point using the second calibration value.

6. The method as recited in claim 1, wherein the action of sending a first data pattern to a first external point comprises the action of sending the first data pattern to a memory storage module.

7. The method as recited in claim 1, wherein the method is performed by a memory controller.

8. The method as recited in claim 1, wherein the action of determining a first calibration value based on the action of determining a first common mode voltage of a first data signal comprises the action of determining the first calibration value such that the first calibration value may be utilized by a voltage driver to adjust a compensated voltage to improve a voltage margin usable for receiving future data signals from the first external point.

9. The method as recited in claim 1, wherein the action of determining a first common mode voltage of a first data signal carrying the first data pattern back comprises at least one of the following actions:
   determining the first common mode voltage of the first data signal using at least a sampler; and
   determining the first common mode voltage of the first data signal using at least a comparison unit, control logic, and a feedback signal.

10. The method as recited in claim 1, wherein the first calibration value comprises a voltage compensation value.

11. The method as recited in claim 1, further comprising:
    activating the first calibration value;
    instructing the first external point to transmit requested data; and
    receiving the requested data from the first external point using the first calibration value.

12. A method for initializing and operating a system having a receiving unit with receiving functionality, comprising:
    executing an initialization, the initialization comprising:
      sending at least one data pattern from the receiving unit to a plurality of external points;
      instructing the plurality of external points to transmit the at least one data pattern back to the receiving unit in a respective plurality of signals;
      determining a respective plurality of calibration values for the plurality of external points responsive to receipt of the respective plurality of signals; and
      storing the respective plurality of calibration values in association with a respective plurality of identifications of the plurality of external points; and
    implementing an operational phase, the operational phase comprising:
      determining that data is to be received from a particular external point of the plurality of external points;
      ascertaining a particular calibration value of the plurality of calibration values, the particular calibration value associated with the particular external point;
      activating the particular calibration value; and receiving the data from the particular external point using the particular calibration value.

13. The method as recited in claim 12, wherein the system comprises a memory system.

14. The method as recited in claim 12, wherein the system comprises a memory controller, and the plurality of external points comprise a plurality of memory storage modules.

15. The method as recited in claim 12, wherein the actions of the implementing an operational phase action are repeated for multiple external points of the plurality of external points.

16. The method as recited in claim 12, wherein the actions of the executing an initialization action are repeated for at least one external point of the plurality of external points.

17. A method for receiving data, comprising:
determining a need to request first data from a first external point;
ascertaining that a first calibration value is associated with the first external point;
activating the first calibration value;
requesting the first external point to transmit the first data; and
receiving the first data from the first external point using the first calibration value.

18. The method as recited in claim 17, further comprising:
determining a need to request second data from a second external point;
ascertaining that a second calibration value is associated with the second external point;
activating the second calibration value;
requesting the second external point to transmit the second data; and
receiving the second data from the second external point using the second calibration value.

19. The method as recited in claim 17, wherein the action of ascertaining that a first calibration value is associated with the first external point comprises the action of accessing a parameters table at an entry having an identification that is associated with the first external point, the entry including the first calibration value.

20. The method as recited in claim 17, wherein the action of activating the first calibration value comprises the action of loading a register with the first calibration value.

21. The method as recited in claim 17, wherein the action of receiving the first data from the first external point using the first calibration value comprises the action of adjusting a voltage that is used to interpret received signaling responsive to the first calibration value.

22. A method for voltage compensation, comprising:
determining a first compensation value based, at least partly, on a first signal received from a first external point;
storing the first compensation value in association with a first identification of the first external point;
determining a second compensation value based, at least partly, on a second signal received from a second external point;
storing the second compensation value in association with a second identification of the second external point;
extracting the second compensation value;
activating the second compensation value; and
receiving data from the second external point using the second compensation value to adjust a voltage.

23. The method as recited in claim 22, wherein:
the action of storing the first compensation value in association with a first identification of the first external point further comprises the action of storing the first compensation value in a parameters data structure; and
the action of storing the second compensation value in association with a second identification of the second external point further comprises the action of storing the second compensation value in the parameters data structure.

24. An integrated circuit configured to perform actions comprising:
determining a need to request first data from a first external point;
ascertaining that a first calibration value is associated with the first external point from a parameters data structure;
activating the first calibration value;
requesting the first external point to transmit the first data;
receiving the first data from the first external point using the first calibration value;
determining a need to request second data from a second external point;
ascertaining that a second calibration value is associated with the second external point from the parameters data structure;
activating the second calibration value;
requesting the second external point to transmit the second data; and
receiving the second data from the second external point using the second calibration value.

* * * * *